(12) United States Patent
Beyer et al.

(10) Patent No.: US 7,297,661 B2
(45) Date of Patent: Nov. 20, 2007

(54) SYNTHETIC BASE FLUID FOR ENHANCING THE RESULTS OF CRUDE OIL CHARACTERIZATION ANALYSES

(75) Inventors: Timothy Martin Beyer, Houston, TX (US); Steven Kyle Watson, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 36 days.

(21) Appl. No.: 10/293,876

(22) Filed: Nov. 13, 2002

(65) Prior Publication Data
US 2003/0119679 A1    Jun. 26, 2003

Related U.S. Application Data

(63) Continuation-in-part of application No. 09/675,703, filed on Sep. 29, 2000, now Pat. No. 6,514,915.

(51) Int. Cl.
C09K 8/35 (2006.01)
(52) U.S. Cl. .................................. 507/103; 507/203
(58) Field of Classification Search .............. 507/103, 507/203, 905; 585/664, 665, 666, 667, 668, 585/669, 670, 671
See application file for complete search history.

(56) References Cited

U.S. PATENT DOCUMENTS

| | | | |
|---|---|---|---|
| 3,391,291 A | | 7/1968 | Benson et al. |
| 3,482,000 A | | 12/1969 | Farnald et al. |
| 3,663,647 A | | 5/1972 | Lanier |
| 3,676,523 A | | 7/1972 | Mason |
| 3,689,584 A | | 9/1972 | Kobetz |
| 4,592,424 A | | 6/1986 | Long et al. |
| 5,087,793 A | * | 2/1992 | Akiyama et al. ........... 585/666 |
| 5,189,012 A | | 2/1993 | Patel et al. |
| 5,589,442 A | | 12/1996 | Gee et al. |
| 5,605,679 A | | 2/1997 | Halliday et al. |
| 5,605,879 A | * | 2/1997 | Halliday et al. ............ 507/103 |
| 5,627,143 A | | 5/1997 | Sawdon |
| 5,691,281 A | * | 11/1997 | Ashjian et al. ............. 507/103 |
| 5,741,759 A | * | 4/1998 | Gee et al. ................... 507/103 |
| 5,851,958 A | * | 12/1998 | Halliday et al. ............ 507/103 |
| 5,869,434 A | | 2/1999 | Mueller et al. |
| 6,054,415 A | * | 4/2000 | Gee et al. ................... 507/103 |
| 6,057,272 A | * | 5/2000 | Gee et al. ................... 507/103 |
| 6,323,157 B1 | * | 11/2001 | Carpenter et al. .......... 507/103 |
| 6,514,915 B1 | * | 2/2003 | Beyer et al. ................ 507/103 |
| 2006/0014647 A1 | | 1/2006 | Beyer et al. |

FOREIGN PATENT DOCUMENTS

WO    WO 99/07805 A  *  2/1999

OTHER PUBLICATIONS

USPTO, Office Action Summary mailed Nov. 17, 2006, U.S. Appl. No. 11/181,542 (11 pages).
Morris Law Firm, Response to Office Action Summary mailed Nov. 17, 2006, U.S. Appl. No. 11/181,542 (20 pages).
USPTO, Office Action Summary mailed May 10, 2007, U.S. Appl. No. 11/181,542 (10 pages).
Morris Law Firm, Response to Office Action Summary mailed May 5, 2007, U.S. Appl. No. 11/181,542 (15 pages).
USPTO, Advisory Action Before Filing of an Appeal Brief mailed Jun. 28, 2007, U.S. Appl. No. 11/181,542 (3 pages).
USPTO, Office Action Summary mailed Mar. 18, 2002, U.S. Appl. No. 09/675,703 (7 pages).
Morris Law Firm, Response to Office Action Summary mailed Mar. 18, 2002, U.S. Appl. No. 09/675,703 (11 pages).
USPTO, Office Action Summary mailed Oct. 7, 2002, U.S. Appl. No. 09/675,703 (5 pages).
Morris Law Firm, Response to Office Action Summary mailed Oct. 7, 2002, U.S. Appl. No. 09/675,703 (8 pages).
USPTO, Notice of Allowance and Fee(s) Due mailed Nov. 22, 2002, U.S. Appl. No. 09/675,703 (5 pages).

* cited by examiner

Primary Examiner—David J. Buttner
(74) Attorney, Agent, or Firm—Paula D. Morris; The Morris Law Firm, P.C.

(57) ABSTRACT

Blends of synthetic olefins for use as the continuous phase of fluids selected from the group consisting of drilling, drill-in, and completion fluids. The blends meet EPA discharge requirements while also permitting investigators to clearly discern the presence and quantity of biological markers in reservoir fluid samples—particularly pristane and phytane.

17 Claims, 34 Drawing Sheets

*FIG. 15*

Whole Oil Alkane Report

Description: Reference Crude Oil
Depth
Customer ID Number
Sample Number REF1

CPI 0.99
N-C9/N-C19 3.43
N-C15/N-C25 5.73

Pristane/Phytane 0.94
Pristane/N-C17 0.41
Phytane/N-C18 0.49

| Compound | Retention Time | Peak Area | Area N-C15=1 | Peak Height | Height N-C15=1 |
|---|---|---|---|---|---|
| N-C4 | 0.00 | 0.00 | 0.000 | 0.00 | 0.000 |
| N-C5 | 1.88 | 45.86 | 0.147 | 28.02 | 0.221 |
| N-C6 | 3.35 | 277.93 | 0.890 | 99.47 | 0.786 |
| N-C7 | 6.63 | 510.14 | 1.634 | 181.28 | 1.432 |
| N-C8 | 10.05 | 559.09 | 1.791 | 230.42 | 1.820 |
| N-C9 | 13.11 | 573.80 | 1.838 | 241.99 | 1.911 |
| N-C10 | 15.86 | 560.86 | 1.796 | 240.74 | 1.901 |
| N-C11 | 18.38 | 520.65 | 1.668 | 211.74 | 1.672 |
| N-C12 | 20.73 | 411.34 | 1.317 | 176.58 | 1.395 |
| N-C13 | 22.93 | 341.79 | 1.095 | 151.24 | 1.194 |
| N-C14 | 25.00 | 324.62 | 1.040 | 137.18 | 1.083 |
| N-C15 | 26.96 | 312.23 | 1.000 | 126.61 | 1.000 |
| N-C16 | 28.81 | 250.33 | 0.802 | 104.52 | 0.826 |
| N-C17 | 30.58 | 218.45 | 0.700 | 91.56 | 0.723 |
| N-C18 | 32.25 | 192.37 | 0.616 | 77.26 | 0.610 |
| N-C19 | 33.85 | 167.16 | 0.535 | 63.77 | 0.504 |
| N-C20 | 35.38 | 134.94 | 0.432 | 54.04 | 0.427 |
| N-C21 | 36.84 | 100.45 | 0.322 | 43.26 | 0.342 |
| N-C22 | 38.25 | 87.28 | 0.280 | 36.89 | 0.291 |
| N-C23 | 39.60 | 80.20 | 0.257 | 32.80 | 0.259 |
| N-C24 | 40.89 | 69.04 | 0.221 | 28.66 | 0.226 |
| N-C25 | 42.14 | 54.52 | 0.175 | 22.11 | 0.175 |
| N-C26 | 43.34 | 48.56 | 0.156 | 20.19 | 0.159 |
| N-C27 | 44.50 | 41.63 | 0.133 | 16.50 | 0.130 |
| N-C28 | 45.62 | 33.35 | 0.107 | 12.88 | 0.102 |
| N-C29 | 46.71 | 26.44 | 0.085 | 10.53 | 0.083 |
| N-C30 | 47.75 | 31.37 | 0.100 | 10.31 | 0.081 |
| N-C31 | 48.77 | 21.72 | 0.070 | 8.15 | 0.064 |
| N-C32 | 49.76 | 24.86 | 0.080 | 9.40 | 0.074 |
| N-C33 | 50.72 | 17.69 | 0.057 | 6.46 | 0.051 |
| N-C34 | 51.65 | 16.96 | 0.054 | 5.65 | 0.045 |
| N-C35 | 52.55 | 10.75 | 0.034 | 4.48 | 0.035 |
| N-C36 | 53.43 | 10.00 | 0.032 | 3.74 | 0.030 |
| N-C37 | 54.29 | 9.85 | 0.032 | 3.31 | 0.026 |
| N-C38 | 55.13 | 5.91 | 0.019 | 2.54 | 0.020 |
| N-C39 | 55.93 | 3.75 | 0.012 | 1.48 | 0.012 |
| N-C40 | 56.73 | 4.32 | 0.014 | 1.49 | 0.012 |
| N-C41 | 57.49 | 1.94 | 0.006 | 0.79 | 0.006 |
| N-C42 | 58.26 | 3.48 | 0.011 | 1.14 | 0.009 |
| N-C43 | 58.99 | 1.44 | 0.005 | 0.60 | 0.005 |
| N-C44 | 59.71 | 1.98 | 0.006 | 0.72 | 0.006 |
| Pristane | 30.74 | 89.06 | | 29.43 | |
| Phytane | 32.46 | 95.08 | | 28.22 | |

FIG. 16

Whole Oil Alkane Report

Description 5% IsoTeq in Reference Crude
Depth  CPI 0.92  Pristane/Phytane 0.60
Customer ID Number  N-C9/N-C19 3.46  Pristane/N-C17 0.43
Sample Number 19678  N-C15/N-C25 5.37  Phytane/N-C18 0.54

| Compound | Retention Time | Peak Area | Area N-C15=1 | Peak Height | Height N-C15=1 |
|---|---|---|---|---|---|
| N-C4 | 0.00 | 0.00 | 0.000 | 0.00 | 0.000 |
| N-C5 | 1.88 | 40.62 | 0.153 | 25.79 | 0.223 |
| N-C6 | 3.35 | 260.59 | 0.979 | 102.36 | 0.884 |
| N-C7 | 6.63 | 479.89 | 1.803 | 172.14 | 1.487 |
| N-C8 | 10.05 | 529.33 | 1.989 | 215.63 | 1.863 |
| N-C9 | 13.11 | 541.45 | 2.034 | 226.15 | 1.954 |
| N-C10 | 15.86 | 530.28 | 1.992 | 229.05 | 1.979 |
| N-C11 | 18.39 | 486.64 | 1.828 | 201.12 | 1.738 |
| N-C12 | 20.74 | 388.80 | 1.461 | 167.50 | 1.447 |
| N-C13 | 22.93 | 322.91 | 1.213 | 144.47 | 1.248 |
| N-C14 | 25.01 | 304.97 | 1.146 | 129.22 | 1.117 |
| N-C15 | 26.96 | 266.17 | 1.000 | 115.73 | 1.000 |
| N-C16 | 28.84 | 464.66 | 1.746 | 144.95 | 1.252 |
| N-C17 | 30.58 | 204.16 | 0.767 | 86.45 | 0.747 |
| N-C18 | 32.27 | 274.14 | 1.030 | 97.67 | 0.844 |
| N-C19 | 33.85 | 156.41 | 0.588 | 60.68 | 0.524 |
| N-C20 | 35.38 | 127.61 | 0.479 | 52.61 | 0.455 |
| N-C21 | 36.85 | 94.83 | 0.356 | 39.41 | 0.341 |
| N-C22 | 38.25 | 83.08 | 0.312 | 35.15 | 0.304 |
| N-C23 | 39.60 | 74.24 | 0.279 | 29.96 | 0.259 |
| N-C24 | 40.89 | 65.07 | 0.244 | 26.70 | 0.231 |
| N-C25 | 42.14 | 49.61 | 0.186 | 20.26 | 0.175 |
| N-C26 | 43.34 | 44.17 | 0.166 | 18.59 | 0.161 |
| N-C27 | 44.50 | 36.16 | 0.136 | 15.35 | 0.133 |
| N-C28 | 45.62 | 29.72 | 0.112 | 11.74 | 0.101 |
| N-C29 | 46.71 | 23.84 | 0.090 | 10.17 | 0.088 |
| N-C30 | 47.75 | 29.97 | 0.113 | 9.77 | 0.084 |
| N-C31 | 48.77 | 23.16 | 0.087 | 8.35 | 0.072 |
| N-C32 | 49.76 | 24.12 | 0.091 | 8.58 | 0.074 |
| N-C33 | 50.72 | 17.18 | 0.065 | 6.44 | 0.756 |
| N-C34 | 51.65 | 14.59 | 0.055 | 4.97 | 0.043 |
| N-C35 | 52.56 | 11.96 | 0.045 | 4.32 | 0.037 |
| N-C36 | 53.43 | 10.92 | 0.041 | 3.65 | 0.032 |
| N-C37 | 54.29 | 6.87 | 0.026 | 2.91 | 0.025 |
| N-C38 | 55.12 | 7.27 | 0.027 | 2.73 | 0.024 |
| N-C39 | 55.94 | 6.43 | 0.024 | 1.44 | 0.012 |
| N-C40 | 56.73 | 4.66 | 0.018 | 1.30 | 0.011 |
| N-C41 | 57.50 | 1.65 | 0.006 | 0.74 | 0.006 |
| N-C42 | 58.26 | 1.76 | 0.007 | 0.74 | 0.006 |
| N-C43 | 58.99 | 1.27 | 0.005 | 0.42 | 0.004 |
| N-C44 | 59.69 | 1.00 | 0.004 | 0.45 | 0.004 |
| Pristane | 30.74 | 88.59 | | 29.43 | |
| Phytane | 32.47 | 146.84 | | 47.77 | |

*FIG. 17*

Whole Oil Alkane Report

Description 10% IsoTeq in Reference Crude
Depth　　　　　　　　　　　　CPI 0.87　　Pristane/Phytane 0.51
Customer ID Number　　　　　　N-C9/N-C19 3.44　　Pristane/N-C17 0.46
Sample Number 19679　　　　　N-C15/N-C25 6.01　　Phytane/N-C18 0.48

| Compound | Retention Time | Peak Area | Area N-C15=1 | Peak Height | Height N-C15=1 |
|---|---|---|---|---|---|
| N-C4 | 0.00 | 0.00 | 0.000 | 0.00 | 0.000 |
| N-C5 | 1.88 | 35.09 | 0.127 | 23.61 | 0.213 |
| N-C6 | 3.35 | 243.97 | 0.886 | 92.40 | 0.833 |
| N-C7 | 6.63 | 443.54 | 1.610 | 157.35 | 1.418 |
| N-C8 | 10.05 | 488.81 | 1.774 | 198.92 | 1.793 |
| N-C9 | 13.11 | 498.49 | 1.809 | 210.86 | 1.900 |
| N-C10 | 15.86 | 490.56 | 1.781 | 214.46 | 1.933 |
| N-C11 | 18.38 | 447.94 | 1.626 | 187.27 | 1.688 |
| N-C12 | 20.73 | 360.09 | 1.307 | 158.19 | 1.426 |
| N-C13 | 22.93 | 299.18 | 1.086 | 131.19 | 1.82 |
| N-C14 | 25.00 | 286.46 | 1.040 | 118.91 | 1.072 |
| N-C15 | 26.96 | 275.49 | 1.000 | 110.97 | 1.000 |
| N-C16 | 28.85 | 617.61 | 2.242 | 201.23 | 1.813 |
| N-C17 | 30.57 | 189.51 | 0.688 | 80.58 | 0.726 |
| N-C18 | 32.27 | 359.87 | 1.306 | 126.99 | 1.144 |
| N-C19 | 33.85 | 144.80 | 0.526 | 56.36 | 0.508 |
| N-C20 | 35.38 | 118.61 | 0.431 | 49.40 | 0.445 |
| N-C21 | 36.84 | 88.44 | 0.321 | 38.00 | 0.342 |
| N-C22 | 38.25 | 77.46 | 0.281 | 32.02 | 0.289 |
| N-C23 | 39.59 | 70.56 | 0.256 | 27.96 | 0.252 |
| N-C24 | 40.89 | 60.12 | 0.218 | 25.21 | 0.227 |
| N-C25 | 42.14 | 45.84 | 0.166 | 19.30 | 0.174 |
| N-C26 | 43.34 | 41.97 | 0.152 | 17.64 | 0.159 |
| N-C27 | 44.50 | 33.67 | 0.122 | 13.90 | 0.125 |
| N-C28 | 45.62 | 26.71 | 0.097 | 10.87 | 0.098 |
| N-C29 | 46.70 | 24.11 | 0.088 | 9.49 | 0.086 |
| N-C30 | 47.75 | 26.88 | 0.098 | 9.32 | 0.084 |
| N-C31 | 48.77 | 21.03 | 0.76 | 7.57 | 0.068 |
| N-C32 | 49.76 | 22.70 | 0.082 | 8.59 | 0.077 |
| N-C33 | 50.72 | 15.11 | 0.055 | 5.78 | 0.052 |
| N-C34 | 51.65 | 15.39 | 0.056 | 4.86 | 0.044 |
| N-C35 | 52.55 | 8.53 | 0.031 | 3.40 | 0.031 |
| N-C36 | 53.43 | 9.24 | 0.034 | 3.60 | 0.032 |
| N-C37 | 54.29 | 8.42 | 0.031 | 2.98 | 0.027 |
| N-C38 | 55.12 | 7.47 | 0.027 | 2.08 | 0.019 |
| N-C39 | 55.93 | 4.05 | 0.015 | 1.50 | 0.014 |
| N-C40 | 56.73 | 3.36 | 0.012 | 1.11 | 0.010 |
| N-C41 | 57.50 | 2.59 | 0.009 | 0.86 | 0.008 |
| N-C42 | 58.26 | 2.20 | 0.008 | 0.80 | 0.007 |
| N-C43 | 58.93 | 0.81 | 0.003 | 0.37 | 0.003 |
| N-C44 | 59.71 | 0.84 | 0.003 | 0.30 | 0.003 |
| Pristane | 30.74 | 86.92 | | 27.87 | |
| Phytane | 32.47 | 171.41 | | 61.56 | |

FIG. 18

Whole Oil Alkane Report

Description 10% IsoTeq in Reference Crude
Depth  CPI 0.83  Pristane/Phytane 0.33
Customer ID Number  N-C9/N-C19 3.46  Pristane/N-C17 0.41
Sample Number 19680  N-C15/N-C25 6.18  Phytane/N-C18 0.46

| Compound | Retention Time | Peak Area | Area N-C15=1 | Peak Height | Height N-C15=1 |
|---|---|---|---|---|---|
| N-C4 | 0.00 | 0.00 | 0.000 | 0.00 | 0.000 |
| N-C5 | 1.88 | 34.77 | 0.133 | 21.60 | 0.203 |
| N-C6 | 3.35 | 240.13 | 0.918 | 84.73 | 0.797 |
| N-C7 | 6.63 | 422.19 | 1.614 | 143.13 | 1.346 |
| N-C8 | 10.06 | 464.44 | 1.776 | 186.80 | 1.757 |
| N-C9 | 13.11 | 479.63 | 1.834 | 198.29 | 1.865 |
| N-C10 | 15.86 | 465.72 | 1.780 | 200.39 | 1.885 |
| N-C11 | 18.39 | 428.09 | 1.637 | 177.78 | 1.672 |
| N-C12 | 20.73 | 340.69 | 1.302 | 147.49 | 1.387 |
| N-C13 | 22.93 | 282.69 | 1.081 | 125.09 | 1.177 |
| N-C14 | 25.00 | 252.11 | 0.964 | 107.84 | 1.014 |
| N-C15 | 26.96 | 261.58 | 1.000 | 106.31 | 1.000 |
| N-C16 | 28.87 | 849.04 | 3.246 | 287.32 | 2.703 |
| N-C17 | 30.58 | 177.29 | 0.678 | 75.20 | 0.707 |
| N-C18 | 32.29 | 477.41 | 1.825 | 171.02 | 1.609 |
| N-C19 | 33.85 | 138.80 | 0.531 | 53.79 | 0.506 |
| N-C20 | 35.38 | 110.46 | 0.422 | 45.50 | 0.428 |
| N-C21 | 36.84 | 82.01 | 0.314 | 34.76 | 0.327 |
| N-C22 | 38.25 | 72.22 | 0.276 | 30.14 | 0.284 |
| N-C23 | 39.60 | 66.52 | 0.254 | 26.87 | 0.253 |
| N-C24 | 40.89 | 56.15 | 0.215 | 22.83 | 0.215 |
| N-C25 | 42.14 | 42.33 | 0.162 | 18.30 | 0.172 |
| N-C26 | 43.34 | 39.03 | 0.149 | 16.18 | 0.152 |
| N-C27 | 44.50 | 32.31 | 0.124 | 13.15 | 0.124 |
| N-C28 | 45.62 | 25.60 | 0.098 | 10.71 | 0.101 |
| N-C29 | 46.71 | 22.17 | 0.085 | 9.00 | 0.085 |
| N-C30 | 47.75 | 25.04 | 0.096 | 8.55 | 0.080 |
| N-C31 | 48.77 | 19.88 | 0.076 | 6.89 | 0.065 |
| N-C32 | 49.76 | 20.47 | 0.078 | 7.71 | 0.073 |
| N-C33 | 50.72 | 13.47 | 0.051 | 5.18 | 0.049 |
| N-C34 | 51.65 | 14.30 | 0.055 | 4.71 | 0.044 |
| N-C35 | 52.55 | 13.43 | 0.051 | 4.21 | 0.040 |
| N-C36 | 53.43 | 8.94 | 0.034 | 3.04 | 0.029 |
| N-C37 | 54.28 | 6.63 | 0.025 | 2.43 | 0.023 |
| N-C38 | 55.12 | 5.99 | 0.023 | 2.06 | 0.019 |
| N-C39 | 55.94 | 3.48 | 0.013 | 1.36 | 0.013 |
| N-C40 | 56.74 | 2.64 | 0.010 | 0.88 | 0.008 |
| N-C41 | 57.51 | 0.93 | 0.004 | 0.39 | 0.004 |
| N-C42 | 58.26 | 1.43 | 0.005 | 0.60 | 0.006 |
| N-C43 | 59.00 | 0.92 | 0.004 | 0.42 | 0.004 |
| N-C44 | 59.72 | 1.37 | 0.005 | 0.49 | 0.005 |
| Pristane | 30.74 | 71.98 | | 24.51 | |
| Phytane | 32.48 | 217.65 | | 81.35 | |

FIG. 19

Whole Oil Alkane Report

Description 25% IsoTeq in Reference Crude
Depth   CPI 0.77   Pristane/Phytane 0.22
Customer ID Number   N-C9/N-C19 3.32   Pristane/N-C17 0.41
Sample Number 19681   N-C15/N-C25 6.25   Phytane/N-C18 0.43

| Compound | Retention Time | Peak Area | Area N-C15=1 | Peak Height | Height N-C15=1 |
|---|---|---|---|---|---|
| N-C4  | 0.00  | 0.00    | 0.000 | 0.00   | 0.000 |
| N-C5  | 1.89  | 31.84   | 0.130 | 19.12  | 0.210 |
| N-C6  | 3.36  | 207.19  | 0.847 | 75.07  | 0.823 |
| N-C7  | 6.64  | 369.38  | 1.510 | 131.87 | 1.446 |
| N-C8  | 10.06 | 404.17  | 1.653 | 165.35 | 1.813 |
| N-C9  | 13.12 | 407.90  | 1.668 | 174.97 | 1.918 |
| N-C10 | 15.87 | 408.27  | 1.669 | 176.59 | 1.936 |
| N-C11 | 18.39 | 373.50  | 1.527 | 156.08 | 1.711 |
| N-C12 | 20.74 | 298.63  | 1.221 | 130.89 | 1.435 |
| N-C13 | 22.94 | 248.02  | 1.014 | 110.15 | 1.208 |
| N-C14 | 25.01 | 220.70  | 0.902 | 95.95  | 1.052 |
| N-C15 | 26.97 | 244.57  | 1.000 | 91.21  | 1.000 |
| N-C16 | 28.89 | 1205.66 | 4.930 | 411.93 | 4.516 |
| N-C17 | 30.58 | 154.87  | 0.633 | 67.09  | 0.736 |
| N-C18 | 32.31 | 683.55  | 2.795 | 240.75 | 2.640 |
| N-C19 | 33.86 | 122.90  | 0.503 | 48.49  | 0.532 |
| N-C20 | 35.39 | 98.59   | 0.403 | 40.56  | 0.445 |
| N-C21 | 36.85 | 72.00   | 0.294 | 29.81  | 0.327 |
| N-C22 | 38.25 | 63.42   | 0.259 | 26.58  | 0.291 |
| N-C23 | 39.60 | 59.08   | 0.242 | 23.36  | 0.256 |
| N-C24 | 40.89 | 49.82   | 0.204 | 21.14  | 0.232 |
| N-C25 | 42.14 | 39.13   | 0.160 | 16.04  | 0.176 |
| N-C26 | 43.34 | 33.47   | 0.137 | 13.84  | 0.152 |
| N-C27 | 44.50 | 28.70   | 0.117 | 11.46  | 0.126 |
| N-C28 | 45.63 | 23.14   | 0.095 | 8.97   | 0.098 |
| N-C29 | 46.71 | 19.83   | 0.081 | 7.93   | 0.087 |
| N-C30 | 47.76 | 19.33   | 0.079 | 7.33   | 0.080 |
| N-C31 | 48.78 | 16.67   | 0.068 | 6.28   | 0.069 |
| N-C32 | 49.76 | 17.94   | 0.073 | 6.89   | 0.076 |
| N-C33 | 50.72 | 14.14   | 0.058 | 4.90   | 0.054 |
| N-C34 | 51.65 | 14.51   | 0.059 | 4.33   | 0.047 |
| N-C35 | 53.43 | 11.64   | 0.048 | 3.22   | 0.035 |
| N-C36 | 54.29 | 7.11    | 0.029 | 2.64   | 0.029 |
| N-C37 | 55.12 | 6.00    | 0.025 | 2.24   | 0.025 |
| N-C38 | 55.12 | 5.67    | 0.023 | 1.95   | 0.021 |
| N-C39 | 55.93 | 4.51    | 0.018 | 1.13   | 0.012 |
| N-C40 | 56.74 | 3.57    | 0.015 | 0.92   | 0.010 |
| N-C41 | 57.51 | 1.46    | 0.006 | 0.48   | 0.005 |
| N-C42 | 58.27 | 2.94    | 0.012 | 0.81   | 0.009 |
| N-C43 | 58.92 | 0.77    | 0.003 | 0.32   | 0.004 |
| N-C44 | 59.72 | 1.21    | 0.005 | 0.49   | 0.005 |
| Pristane | 30.75 | 64.12  |       | 21.95  |       |
| Phytane  | 32.49 | 293.39 |       | 118.06 |       |

FIG. 20

Whole Oil Alkane Report

Description 40% IsoTeq in Reference Crude
Depth     CPI 0.69    Pristane/Phytane 0.12
Customer ID Number    N-C9/N-C19 3.44    Pristane/N-C17 0.42
Sample Number 19682    N-C15/N-C25 6.49    Phytane/N-C18 0.38

| Compound | Retention Time | Peak Area | Area N-C15=1 | Peak Height | Height N-C15=1 |
|---|---|---|---|---|---|
| N-C4  | 0.00  | 0.00    | 0.000 | 0.00   | 0.000 |
| N-C5  | 1.89  | 23.90   | 0.121 | 15.01  | 0.209 |
| N-C6  | 3.37  | 157.23  | 0.799 | 56.33  | 0.784 |
| N-C7  | 6.64  | 293.15  | 1.490 | 105.83 | 1.473 |
| N-C8  | 10.06 | 322.16  | 1.637 | 132.24 | 1.840 |
| N-C9  | 13.12 | 327.54  | 1.665 | 138.88 | 1.933 |
| N-C10 | 15.87 | 319.17  | 1.625 | 140.37 | 1.953 |
| N-C11 | 18.39 | 295.75  | 1.503 | 122.55 | 1.705 |
| N-C12 | 20.74 | 234.35  | 1.191 | 102.64 | 1.428 |
| N-C13 | 22.94 | 194.90  | 0.991 | 87.55  | 1.218 |
| N-C14 | 25.01 | 190.79  | 0.970 | 79.09  | 1.101 |
| N-C15 | 26.97 | 196.76  | 1.000 | 71.86  | 1.000 |
| N-C16 | 28.92 | 1735.67 | 8.821 | 586.93 | 8.167 |
| N-C17 | 30.58 | 120.46  | 0.612 | 51.82  | 0.721 |
| N-C18 | 32.33 | 1048.44 | 5.329 | 353.35 | 4.917 |
| N-C19 | 33.86 | 95.22   | 0.484 | 37.47  | 0.521 |
| N-C20 | 35.39 | 77.68   | 0.395 | 32.17  | 0.448 |
| N-C21 | 36.85 | 56.79   | 0.289 | 24.14  | 0.336 |
| N-C22 | 38.25 | 49.84   | 0.253 | 21.15  | 0.294 |
| N-C23 | 39.60 | 45.23   | 0.230 | 18.48  | 0.257 |
| N-C24 | 40.89 | 38.32   | 0.195 | 16.22  | 0.226 |
| N-C25 | 42.14 | 30.30   | 0.154 | 12.42  | 0.173 |
| N-C26 | 43.34 | 26.34   | 0.134 | 11.10  | 0.154 |
| N-C27 | 44.50 | 21.93   | 0.111 | 9.12   | 0.127 |
| N-C28 | 45.63 | 17.93   | 0.091 | 6.96   | 0.097 |
| N-C29 | 46.71 | 14.61   | 0.074 | 5.74   | 0.080 |
| N-C30 | 47.76 | 16.36   | 0.083 | 5.75   | 0.080 |
| N-C31 | 48.77 | 14.21   | 0.072 | 5.01   | 0.070 |
| N-C32 | 49.76 | 13.98   | 0.071 | 5.10   | 0.071 |
| N-C33 | 50.72 | 8.46    | 0.043 | 3.11   | 0.043 |
| N-C34 | 51.65 | 12.16   | 0.062 | 3.34   | 0.047 |
| N-C35 | 52.56 | 6.63    | 0.034 | 2.34   | 0.032 |
| N-C36 | 53.43 | 6.20    | 0.032 | 2.21   | 0.031 |
| N-C37 | 54.29 | 5.17    | 0.026 | 1.80   | 0.025 |
| N-C38 | 55.12 | 3.71    | 0.019 | 1.49   | 0.021 |
| N-C39 | 55.94 | 2.73    | 0.014 | 0.93   | 0.013 |
| N-C40 | 56.73 | 2.73    | 0.014 | 0.86   | 0.012 |
| N-C41 | 57.51 | 0.81    | 0.004 | 0.41   | 0.006 |
| N-C42 | 58.26 | 0.96    | 0.005 | 0.41   | 0.006 |
| N-C43 | 58.94 | 0.82    | 0.004 | 0.32   | 0.004 |
| N-C44 | 59.72 | 0.80    | 0.004 | 0.39   | 0.005 |
| Pristane | 30.76 | 50.06  |  | 17.56  |  |
| Phytane  | 32.51 | 401.49 |  | 164.43 |  |

SYNTHETIC BASE FLUID FOR ENHANCING THE RESULTS OF CRUDE OIL CHARACTERIZATION ANALYSES

The present application is a continuation-in-part of application Ser. No. 09/675,703, now U.S. Pat. No. 6,514,915.

FIELD OF THE INVENTION

The invention relates to blends of synthetic olefins for use as the continuous phase of fluids selected from the group consisting of drilling, drill-in, and completion fluids. The blends meet EPA discharge requirements while also permitting investigators to clearly discern the presence and quantity of biological markers in reservoir fluid samples—particularly pristane and phytane.

BACKGROUND OF THE INVENTION

Synthetic drilling fluids are prepared using isomerized olefins and linear alpha olefins in many combinations. The variety of olefin blends that are available today is the result of efforts to provide an adequate supply of base fluid to a robust market. Another reason for the variety of available blends is the variation in supply of olefin products from olefin manufacturers based on differences in manufacturing processes.

Environmental regulations require synthetic drilling fluid systems to meet a given set of test protocols in order for the cuttings generated by these systems to be discharged into the environment. Current evidence suggests that linear alpha olefins—particularly those having fewer than 14 carbon atoms—contribute to aquatic toxicity. The same toxicity problem apparently does not exist for isomerized olefins having 14 (or more) carbon atoms.

In addition to toxicity issues, it is important for the synthetic base used in a drilling system fluid not to interfere with the analysis of reservoir fluids from the drilling or production operation. Two compounds for which the reservoir fluids commonly are evaluated are pristane (2,6,10,14-tetramethylpentadecane; also known as norphytane) and phytane (2,6,10,14-tetramethylhexadecane). The presence of these two compounds in reservoir fluids has been widely studied, and their presence and ratio are benchmark indicators of the potential economic value of any crude oil to be found in the formation being drilled. It is important for a drilling system fluid not to interfere with accurate analysis of these economic indicators.

Unfortunately, certain olefins or olefin blends interfere with an accurate analysis of pristane and phytane content in reservoir fluids, at least when the analytical tool used is gas chromatography (GC). Olefin-based drilling system fluids are needed that both meet environmental standards and do not interfere with an accurate analysis of the pristane and phytane content of reservoir fluids.

SUMMARY OF THE INVENTION

The present application provides a drilling system fluid adapted to provide accurate reservoir fluid characterization analysis, said drilling system fluid comprising a continuous phase comprising a quantity of isomerized olefins, a majority of said isomerized olefins having from 15 to 16 carbon atoms.

BRIEF DESCRIPTION OF THE FIGURES

FIGS. 8a-14a contain full range chromatograms for each of the samples used in Example 1.

FIGS. 8b-14b contain nC8 to nC13 Detailed View of the samples used in Example 1 (FIGS. 9a-15a).

FIGS. 8c-14c contain nC17/nC18/Pristane/Phytane view of the samples in Example 1 (FIGS. 9a-15a).

FIGS. 15-20 are the whole oil alkane reports for the samples in Example 1.

DETAILED DESCRIPTION OF THE INVENTION

Figure 1:
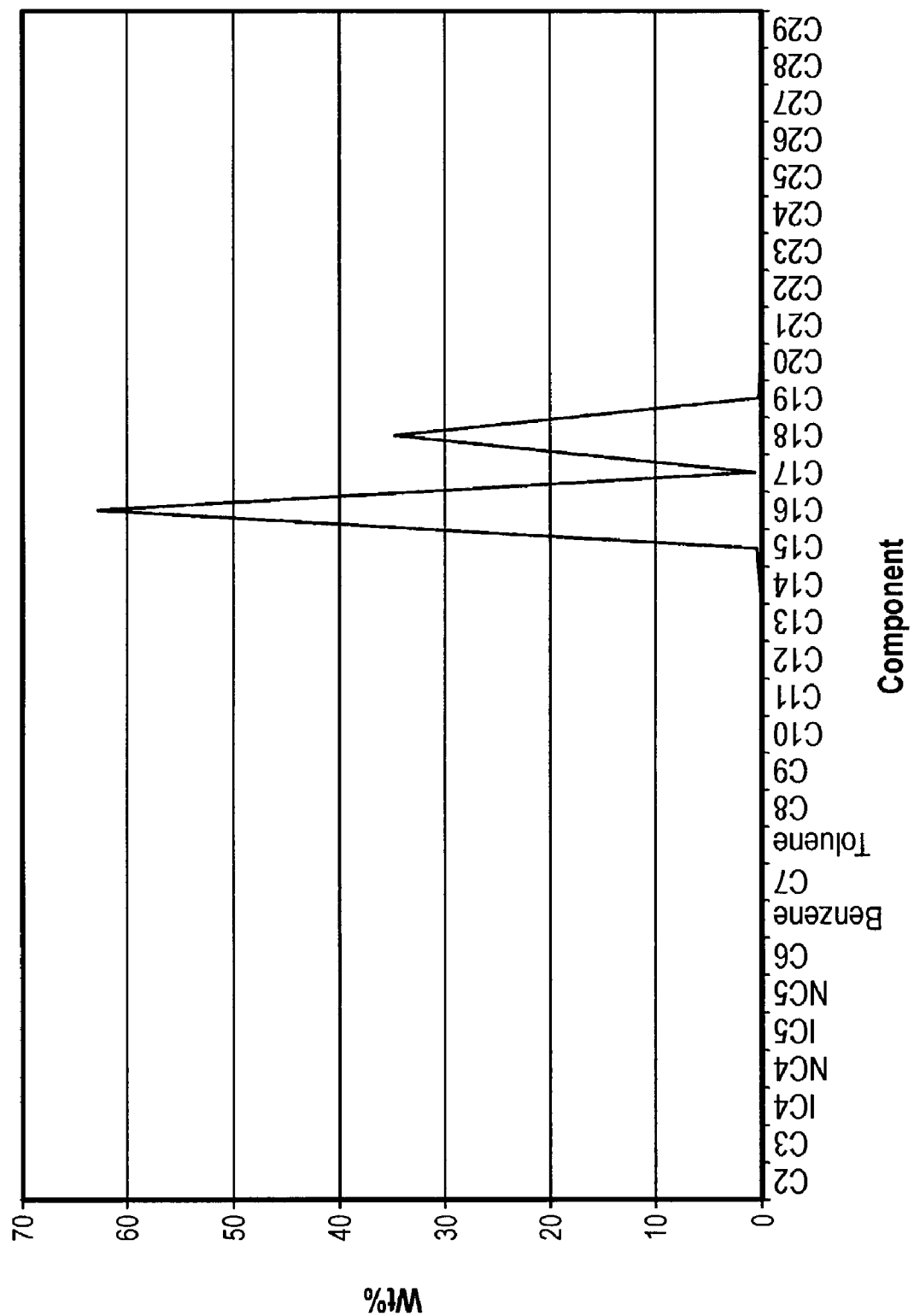
FIGS. 1-7 represent the quantitative component distribution for samples used in Example 1.
Figure 2:
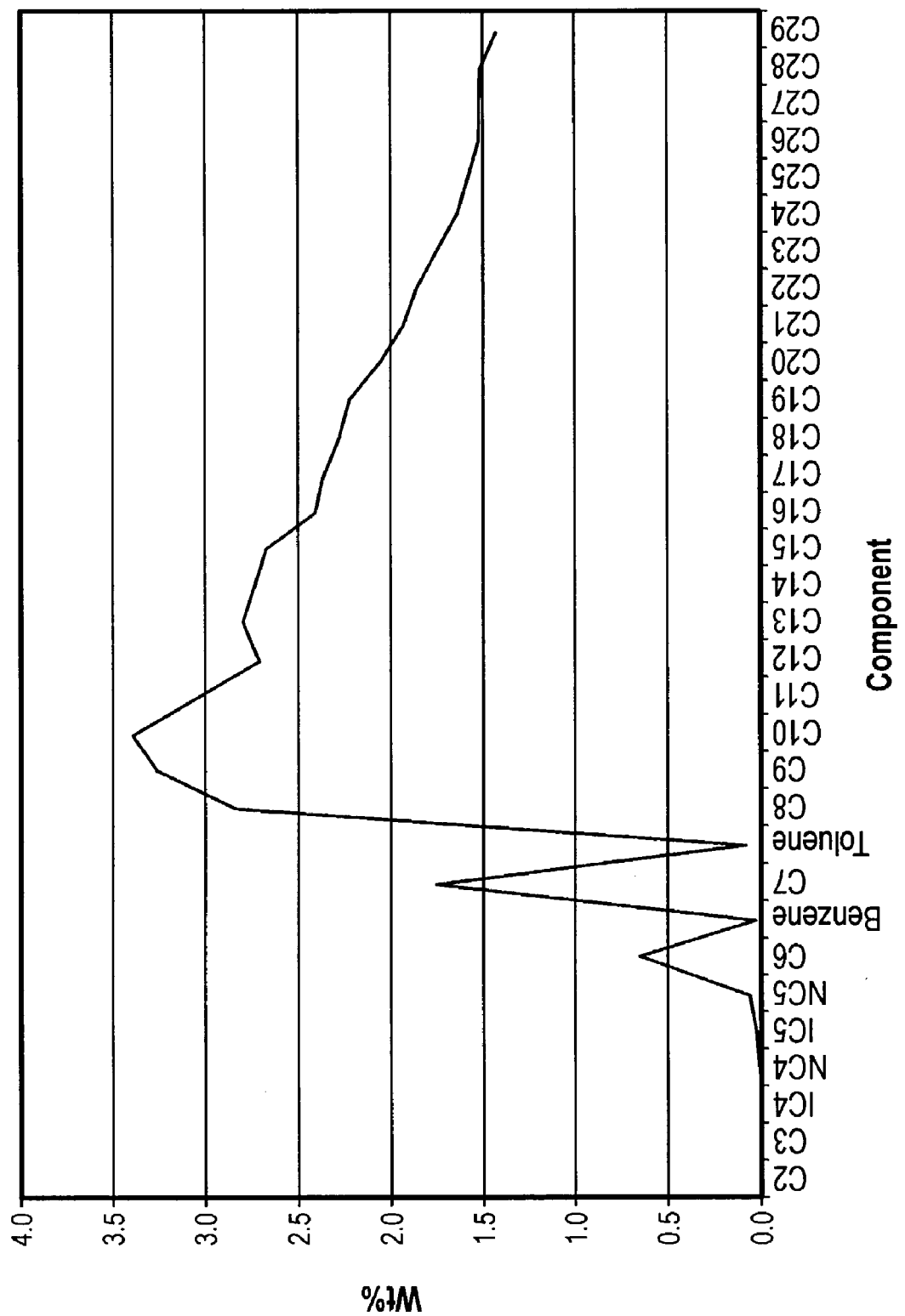
Figure 3:
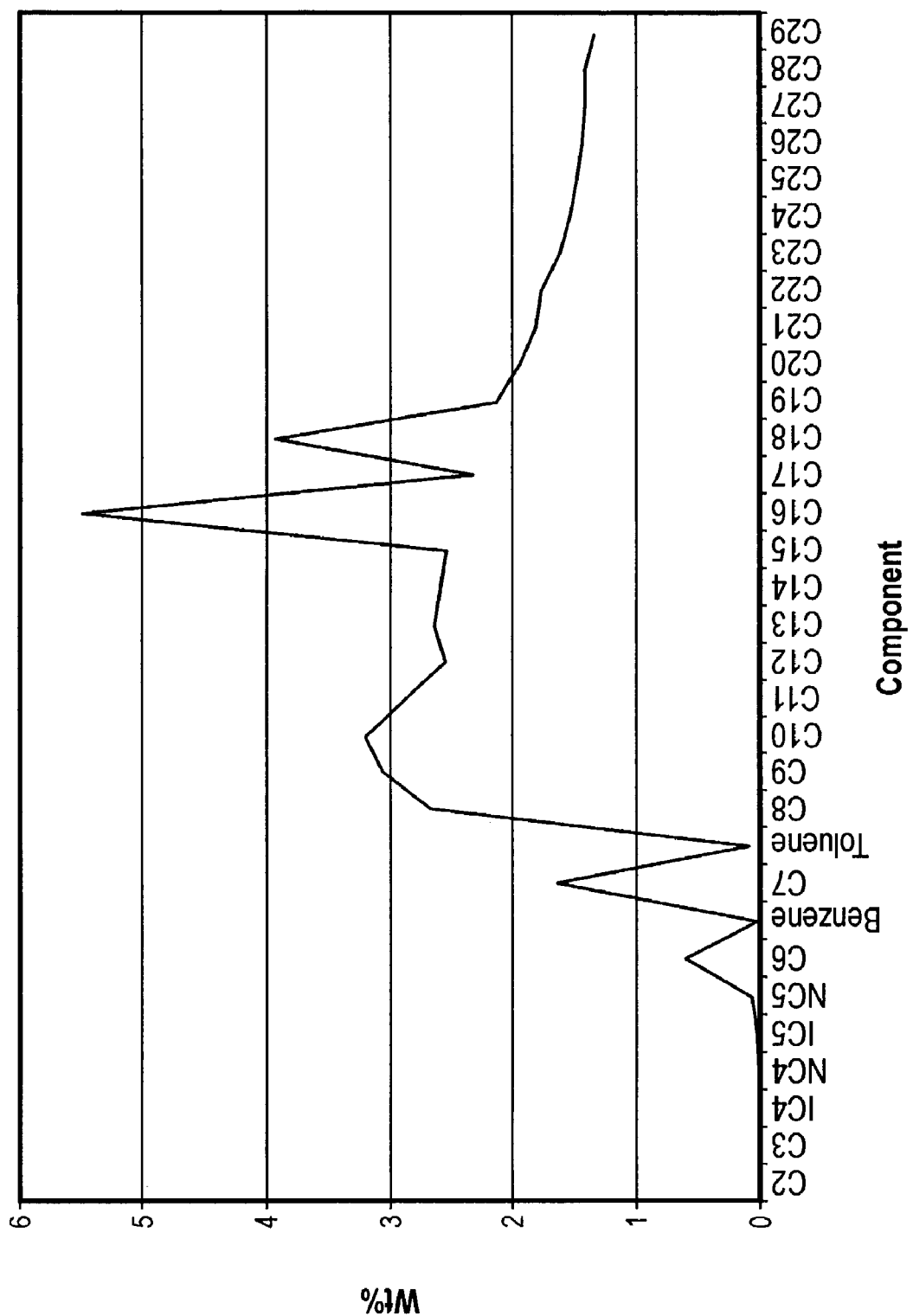

The present invention provides olefin blends useful as the base fluid in a synthetic oil-base drilling system fluid. The blends (1) do not interfere with the evaluation of the presence and quantity of pristane and phytane in reservoir fluids, and (2) meet environmental regulations for discharge while providing excellent drilling performance.

The blends comprise at least "isomerized olefins" (defined below), preferably an "IO blend" in which a majority of the olefins have $C_{15}/C_{16}$ isomerized olefins. The blends also may comprise one or more "linear alpha olefins," defined herein as olefins that preferably are linear and have a "double bond," or an unsaturated carbon-carbon bond at the terminal or alpha position of the carbon backbone. Suitable LAO's do not interfere with the analysis of reservoir fluids using gas chromatography at a concentration of about 20 vol. % or less, preferably about 15 vol. % or less. A preferred LAO is $C_{16}$.

Applicants have discovered that, when combined with $C_{15}/C_{16}$ isomerized olefins, $C_{16}$ LAO's do not interfere with the analysis of reservoir fluids using gas chromatography at a concentration of about 20 vol. % or less, preferably about 15 vol. % or less. Pristane elutes in a region between the $C_{16}$ and $C_{18}$ olefin peaks with no overlap between the observed peaks. Phytane elutes in a region slightly upscale from the $C_{18}$ olefin peak, and does not overlap with the $C_{16}$ linear alpha olefin peak.

The results are somewhat different for "isomerized olefins." Isomerized olefins do not interfere with the peaks observed for pristane unless they include $C_{18}$ range isomerized olefins. The peak for the isomerized olefins containing 18 carbon atoms is broad enough to extend into the region of, and overlay the peak observed for phytane. This is in contrast to the $C_{16}$ linear alpha olefins, whose presence does not interfere with the peak observed for phytane.

In general usage, the term "isomerized olefins" refers to olefins that are produced by skeletally isomerizing linear alpha olefins into a series of isomers of the same carbon chain length but with differing double bond position, creating a broader fingerprint. As used herein, the term "isomerized olefins" is broader, and is defined to include olefins made by skeletal isomerization and by other processes. For example, linear alpha olefins (LAO's) may be formed by polymerizing ethylene—which generally is derived from the catalytic cracking of naphtha—using known procedures. LAO's are then catalytically modified to create the isomerized olefins. Suitable procedures that may be adapted by persons of ordinary skill in the art to form the olefins of the present invention are described in U.S. Pat. No. 5,741,759, incorporated herein by reference; and, *Kirk-Othmer Encyclopedia of Chemical Technology* (3d Ed. 1981), pp. 487-491, incorporated herein by reference. See also U.S. Pat. Nos. 3,482,000; 3,391,291; 3,689,584; 3,663,647; 3,676,523; and, *Hydrocarbon Process,* 58(11) 128 (1979), referred to in the cited Kirk-Othmer text, and incorporated herein by reference. Preferred IO's are commercially available from Shrieve Chemical Company under the name BIOBASE™. The composition and preparation of these IO's is described in U.S. Pat. No. 3,482,000, incorporated herein by reference.

"Isomerized olefins" ("IO's"), as defined herein, have the following general formula:

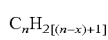

$C_nH_{2[(n-x)+1]}$ wherein n is from about 14 to about 17; x is the number of carbon-carbon double bonds; and, x is from about 1 to about n/2. In a preferred IO blend, n is 15-16 for a majority of the olefins in the blend. In a more preferred IO blend, n is 15-16 for about 50 vol. % or more of the blend, more preferably for about 70 vol. % or more of the blend. In a more preferred embodiment, the vol. % olefin in which n=15 is substantially the same as the vol. % in which n=16. In a most preferred embodiment, about 70 vol. % or more of the blend consists of isomerized olefins comprising approximately an equal proportion of C15 and C16 olefins. The double bonds in the olefin isomers preferably are located internally within the carbon backbone. As used herein, the phrase "internally within the carbon backbone" refers to a location other than at a terminal end of the carbon backbone.

Suitable isomerized olefins for a majority of the blend also are represented by the following general formula:

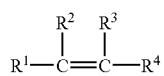

wherein, $R^1$ and $R^4$ independently are selected from the group consisting of straight chain alkyl, alkenyl, and polyalkenyl groups having from about 1 to about 14 carbon atoms, and branched alkyl, alkenyl, and polyalkenyl groups having from about 1 to about 14 carbon atoms, said branched alkyl, alkenyl, and polalkenyl groups further comprising from about 0 to about 2 substituents selected from the group consisting of alkyl and alkenyl groups having from about 1 to about 5 carbon atoms; and, $R^2$ and $R^3$ independently are selected from the group consisting of hydrogen, alkyl, and alkenyl groups having from about 1 to about 5 carbon atoms, provided that the total number of carbon atoms in said isomerized olefins is from about 15 to about 16. Preferred isomerized olefins are other than polyalphaolefins.

Preferably, the isomerized olefins have a single unsaturated carbon-carbon bond located at a position other than the terminal or alpha-position, and have from about 0 to about 2 substituents selected from the group consisting of alkyl groups having from about 1 to about 2 carbon atoms.

A fluid comprising primarily $C_{15}$ and $C_{16}$ IO's should not interfere with the analysis of pristane and phytane levels. However, the addition of LAO's, preferably $C_{16}$ LAO's, render such a fluid less toxic. Therefore, it is preferred to include as much LAO, preferably as much $C_{16}$ LAO, as possible in the blend in order to minimize the toxicity of the fluid. The preferred $C_{16}$ LAO used in the present blend has the following structure:

$H_2C=(CH_2)_{14}CH_3$

The IO's are blended with from about 0 vol. % to about 20 vol. % $C_{16}$ LAO's, preferably from about 10 to about 20 vol. %, and most preferably about 15 vol. % $C_{16}$ LAO's. The maximum amount of preferred LAO is defined as the maximum amount permitted in the isomerized olefin blends described in U.S. Pat. No. 5,741,759, incorporated herein by reference.

As a practical matter, the $C_{15}/C_{16}$ IO's and the $C_{16}$ LAO's will contain some impurities, typically as byproducts of the manufacturing process. The invention contemplates that these impurities will be present in the olefin blend, and the use of the phrase "consisting essentially of" to define the olefins used in the blend is not intended to exclude the presence of such impurities. Exemplary impurities include, but are not necessarily limited to the following: residual amounts of IO's and LAO's with different carbon numbers; such as $C_{14}$ and $C_{17}$ IO's and LAO's; vinylidene; cis-and trans-2 tetradecene; 1-octadecene, and, paraffin. Preferred $C_{15}/C_{16}$ IO's and the $C_{16}$ LAO's may include 1-octadecene as an impurity, but preferably in an amount that will maintain the total quantity of $C_{16}$+olefins at about 20 volume % or less, preferably about 15 volume % or less of the blend.

The blend of the present invention may be used as the base fluid for substantially any synthetic hydrocarbon base drilling system fluid, including but not necessarily limited to a drilling, drill-in, or completion system fluids. In a preferred embodiment, the drilling system fluid is a drill-in fluid. Preferred commercially available systems are GEO-TEQ® or OMNI-FLOW®, both of which are commercially available from Baker Hughes INTEQ.

The invention will be better understood with reference to the following examples, which are illustrative only and should not be interpreted as limiting the claims:

EXAMPLE I

A synthetic drilling mud, labeled "Isoteq," was subjected to a whole oil chromatography mixing study. The synthetic Isoteq was analyzed and mixed sequentially at 5%, 10%, 15%, 25% and 40% by weight with a standard Gulf of Mexico reference crude oil, as shown in the following Table. Each mixture and the original unmixed samples were analyzed by whole oil gas chromatography and the resultant data examined statistically.

Table A contains a list of the samples, and also certain results.

TABLE A

| Description | Lab ID | DF Used | Oil Added | Total Weight | Wt. % Additive | Pr/Ph | Pr/nC17 | Ph/nC18 | CPI | SF |
|---|---|---|---|---|---|---|---|---|---|---|
| ISOTEQ™ | 19677 | — | — | — | — | | | | | |
| Reference Oil | REF1 | — | — | — | — | 0.937 | 0.408 | 0.494 | 0.99 | −0.1624 |
| 5% Additive | 19678 | 1.0043 | 19.0906 | 20.0949 | 5 | 0.603 | 0.434 | 0.536 | 0.92 | −0.1620 |
| 10% Additive | 19679 | 1.0015 | 9.0158 | 10.0173 | 10 | 0.507 | 0.459 | 0.476 | 0.87 | −0.1620 |
| 15% Additive | 19680 | 0.9948 | 5.6376 | 6.6324 | 15 | 0.331 | 0.406 | 0.456 | 0.83 | −0.1621 |
| 25% Additive | 19681 | | | | 25 | 0.219 | 0.414 | 0.429 | 0.77 | −0.1624 |
| 40% Additive | 19682 | | | | 40 | 0.125 | 0.416 | 0.383 | 0.69 | −0.1642 |

Ratios were formed using closely eluting peaks ranging from C5 to C18. Peaks affected by the synthetic were included in the ratio calculation process. Hierarchical cluster analysis was used to determine the relative similarity of difference among the mixtures.

The procedure used to give quantitative compositions of crude oils and condensates was capillary gas chromatography (CGC). The standard calibration curve was determined for one set of tests using the following calibration standards: Prudhoe Bay Oil, Identifier: Reference "C"; Colombian Oil, Identifier: Reference "W"; D-2887 Reference Gas Oil, Identifier: RGO. The standard calibration curve was determined for another set of tests using the following calibration standards: Bradley Minerals Oil, Identifier: Reference "BM"; and, Colombian Oil, Identifier: Reference "W".

Detailed data, including compositions, normal paraffin and light hydrocarbon reports, as well as chromatograms for the samples, are given in the following Figures: quantitative component distribution (FIGS. 1-7); full range chromatograms (FIGS. 8a-14a); nC8 to nC13 Detailed Views (FIGS. 8b-14b); nC17/nC18/Pristane/Phytane views (FIGS. 8c-14c); whole oil alkane reports (FIGS. 15-20); and, graphs of the normal alkane distribution for the samples (FIGS. 21-26).

Figure 8A:
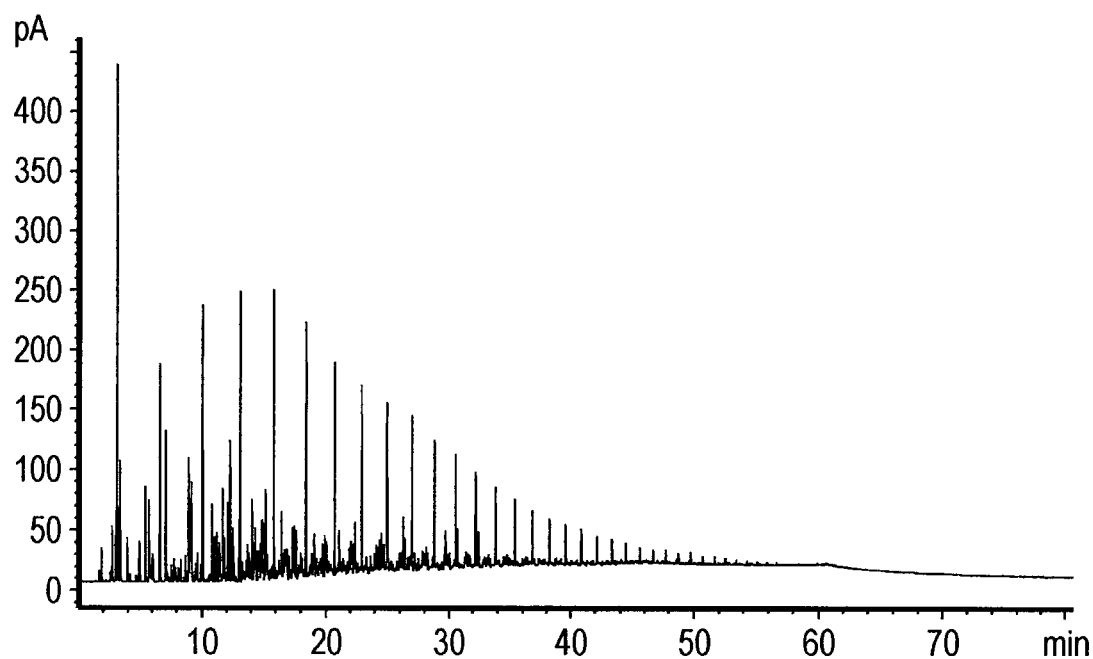
Figure 9A:
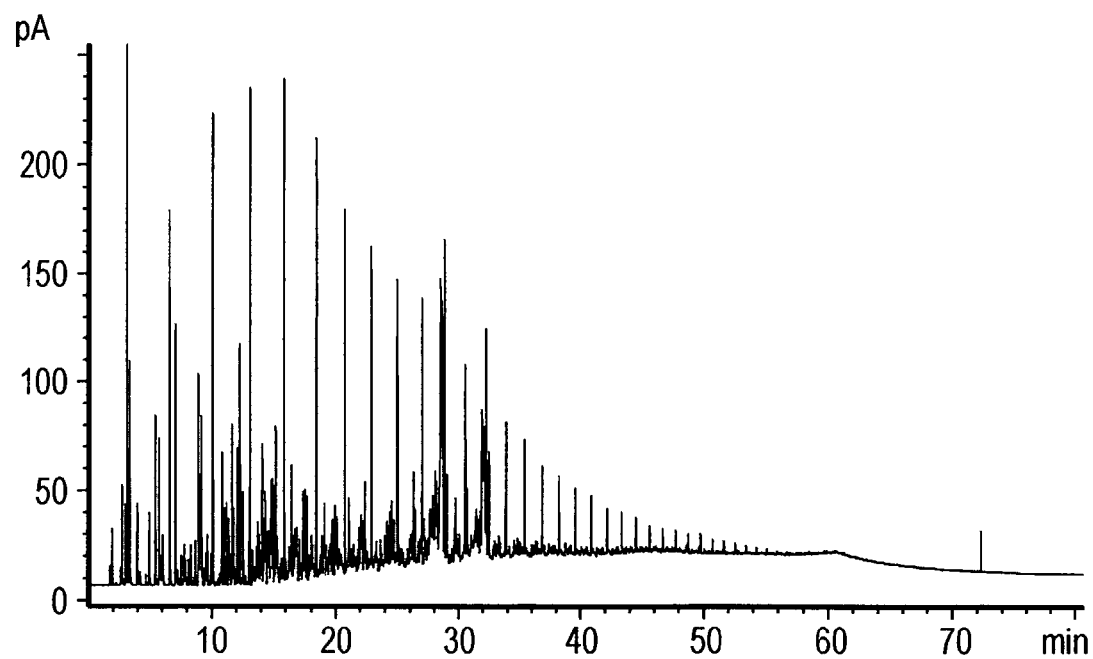
Figure 14A:
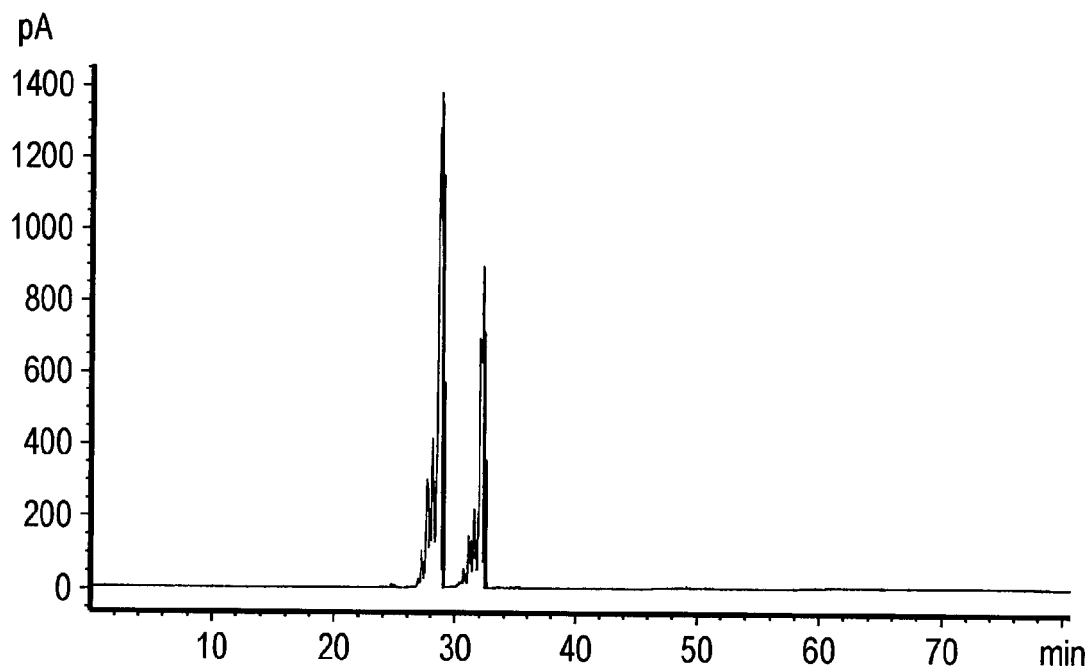
Figure 8B:
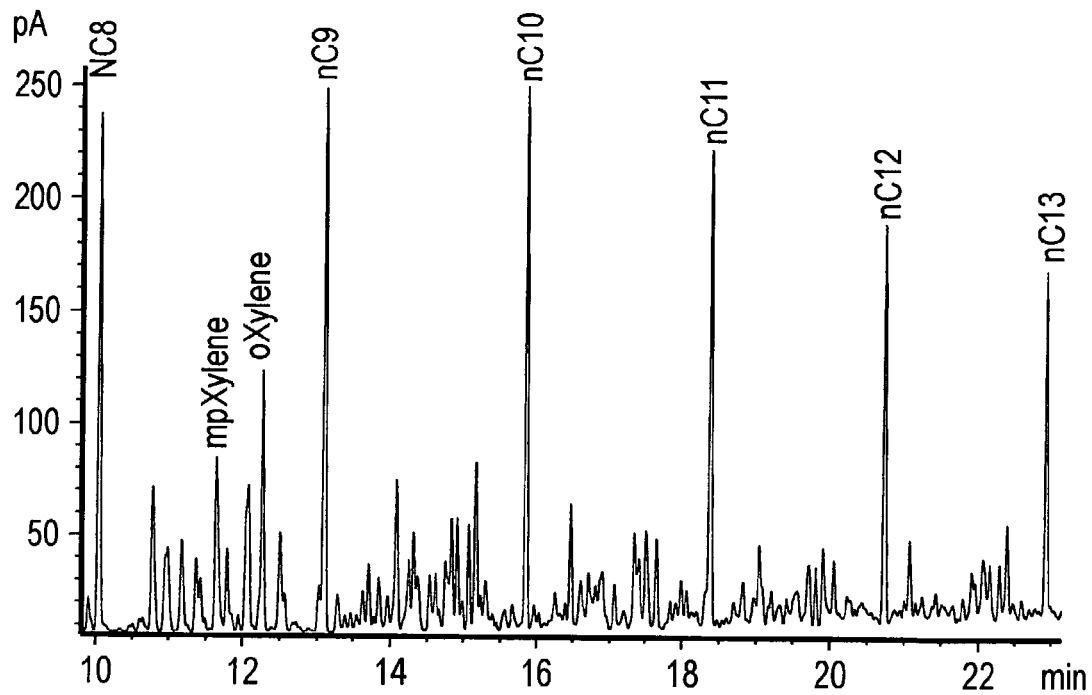
Figure 8C:
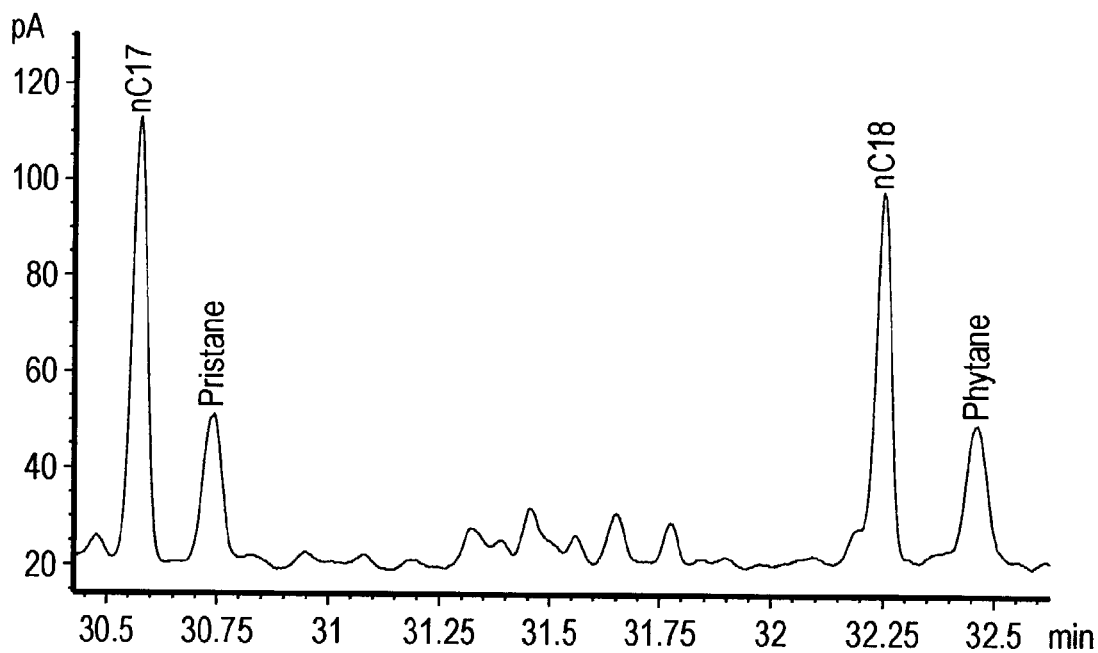
Figure 9C:
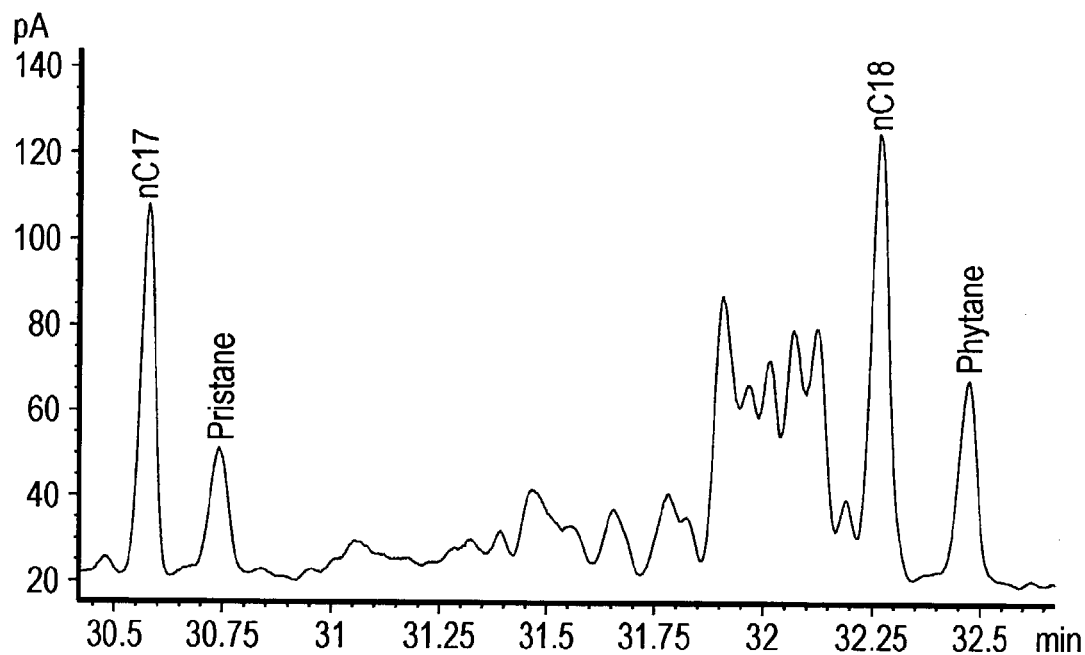
Figure 9B:
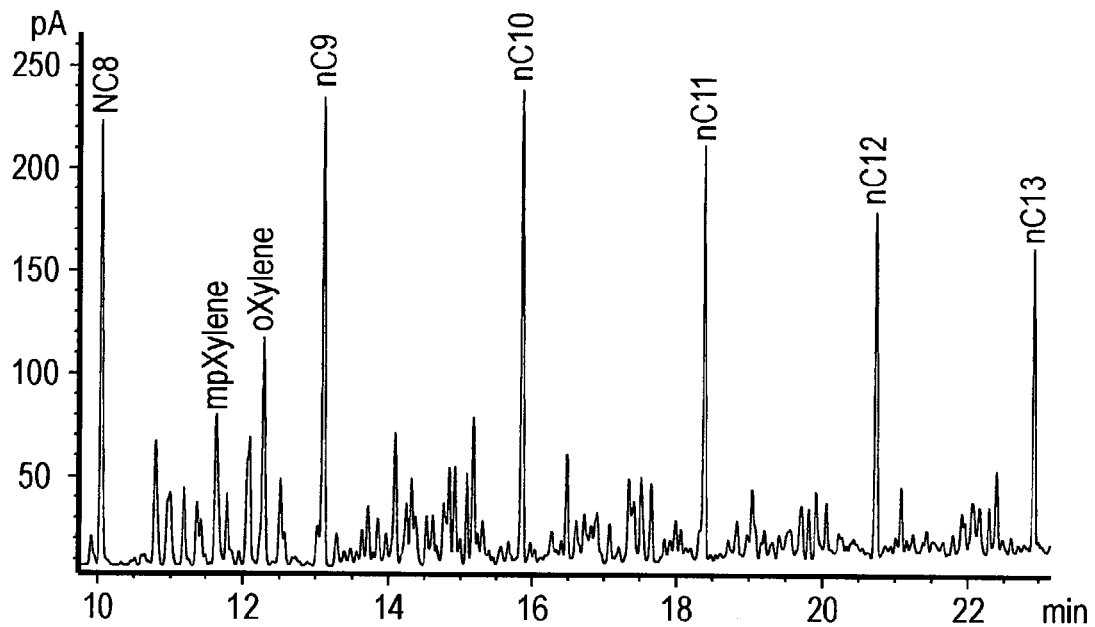
Figure 10B:
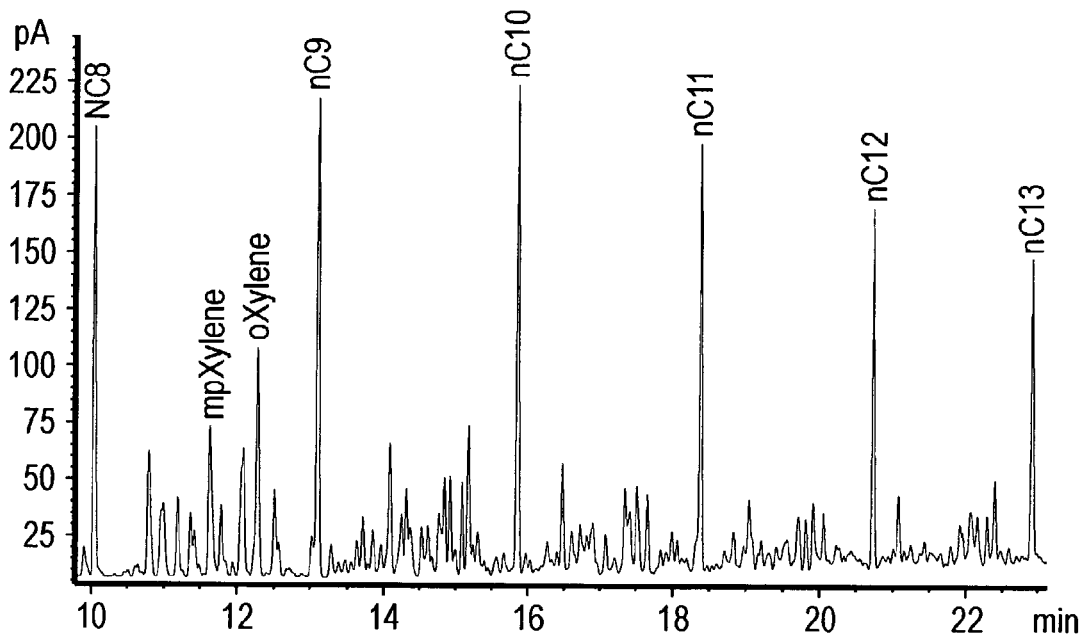
Figure 10A:
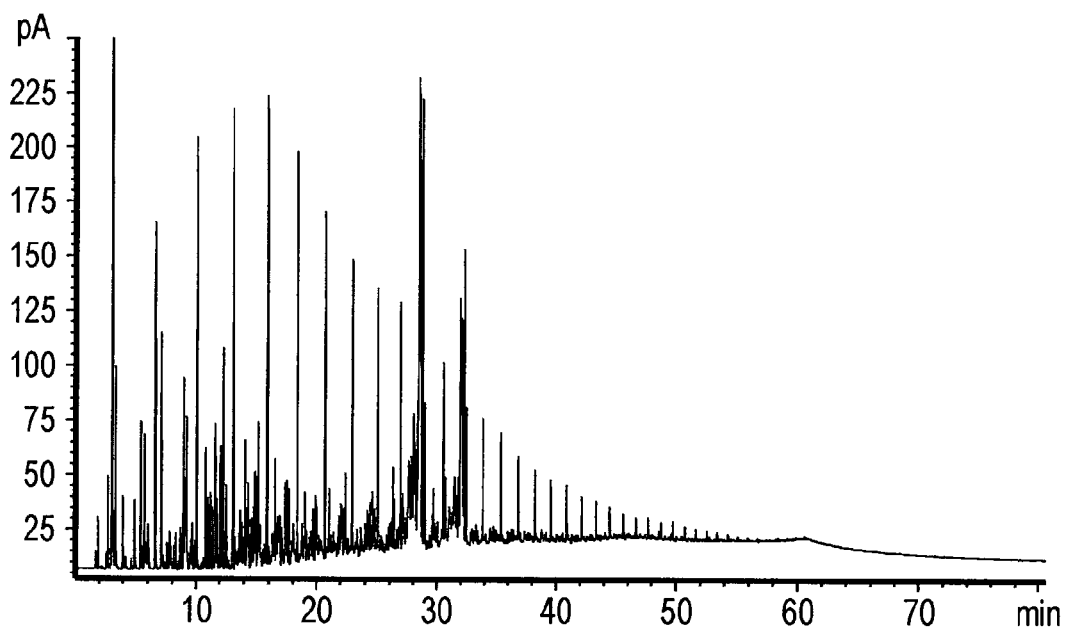
Figure 11A:
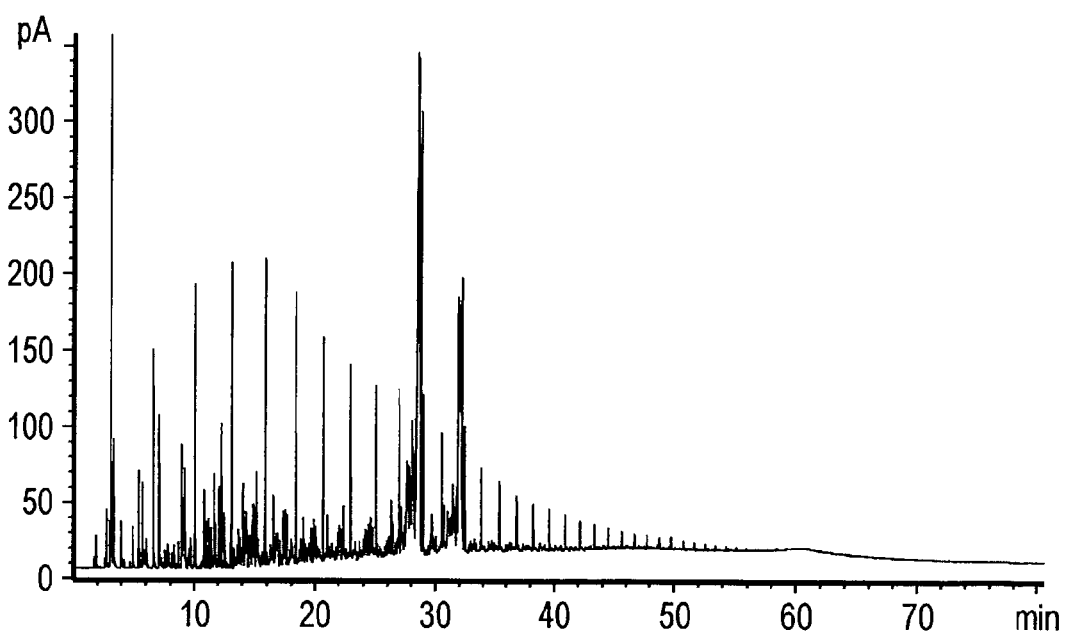
Figure 10C:
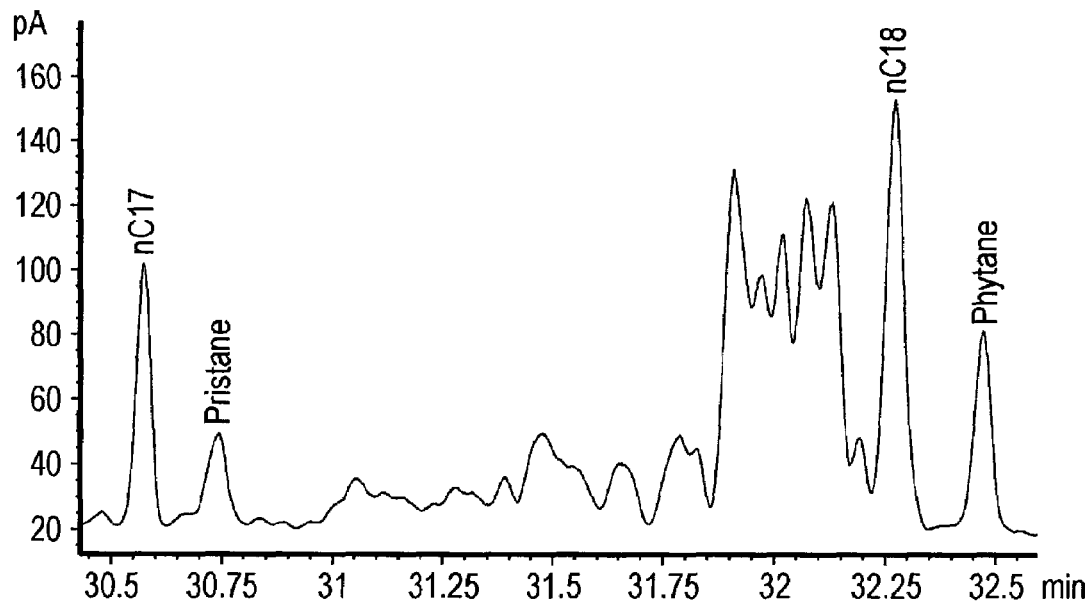
Figure 11C:
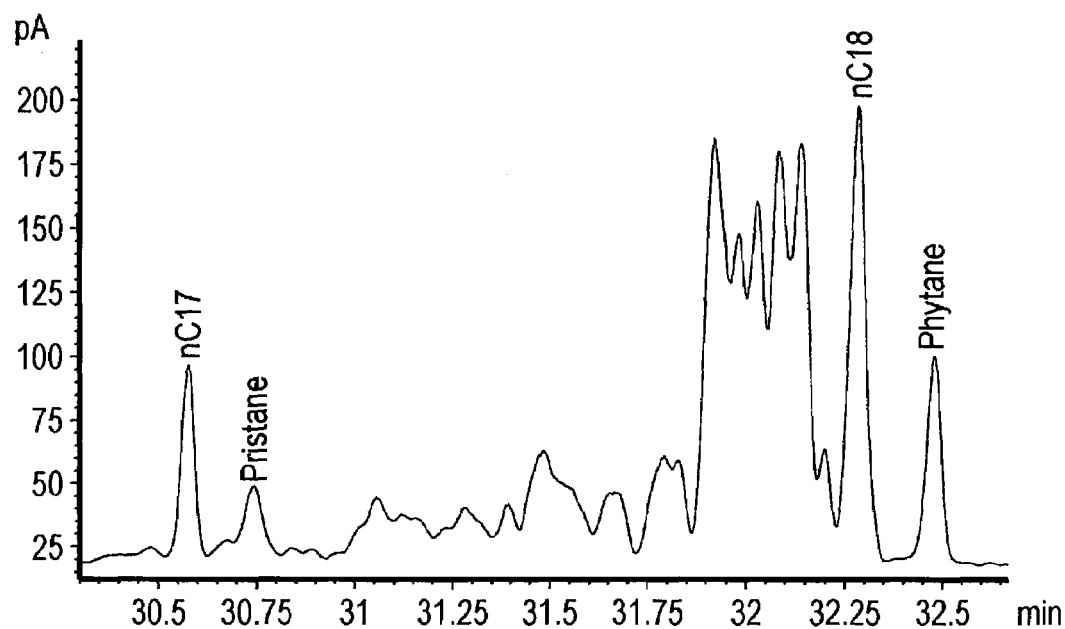
Figure 11B:
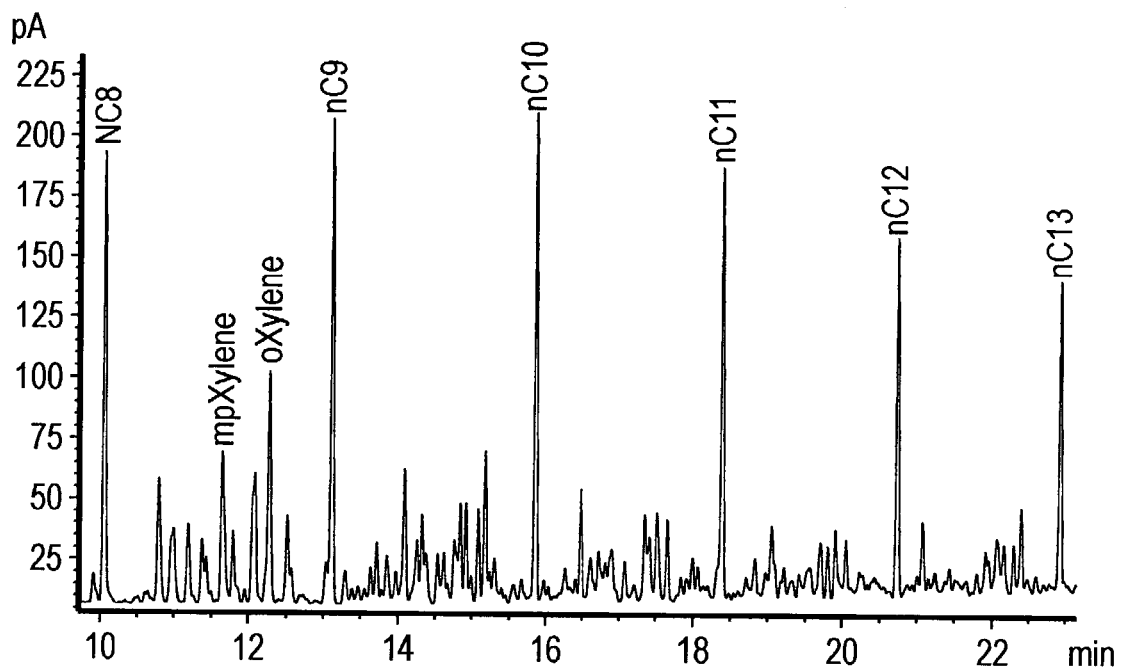
Figure 12B:
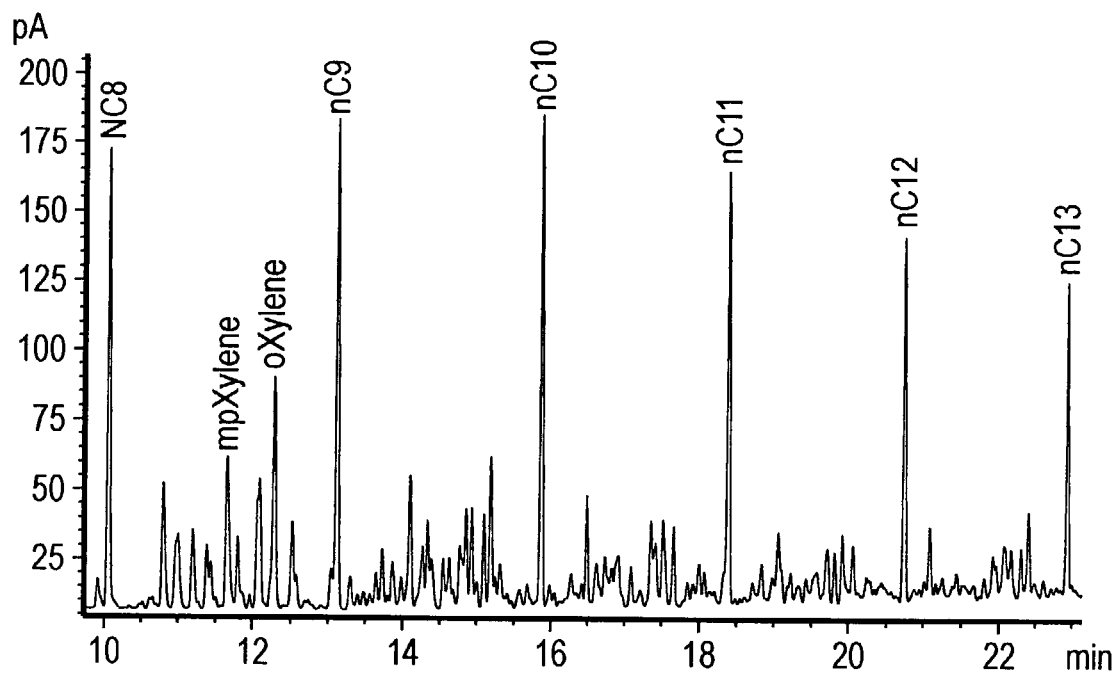
Figure 12A:
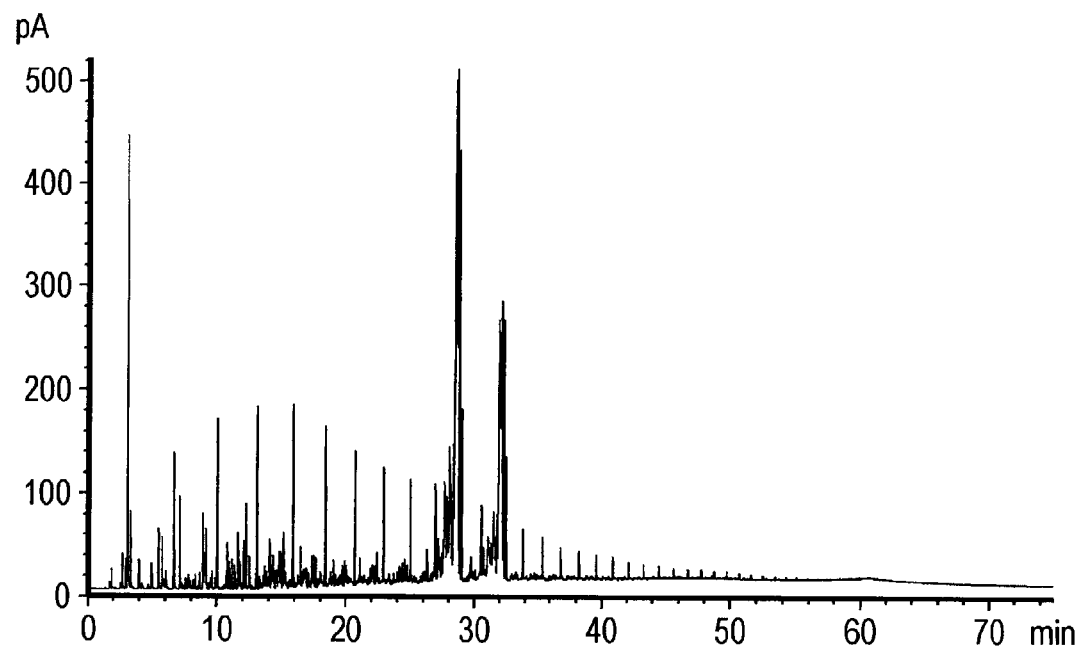
Figure 13A:
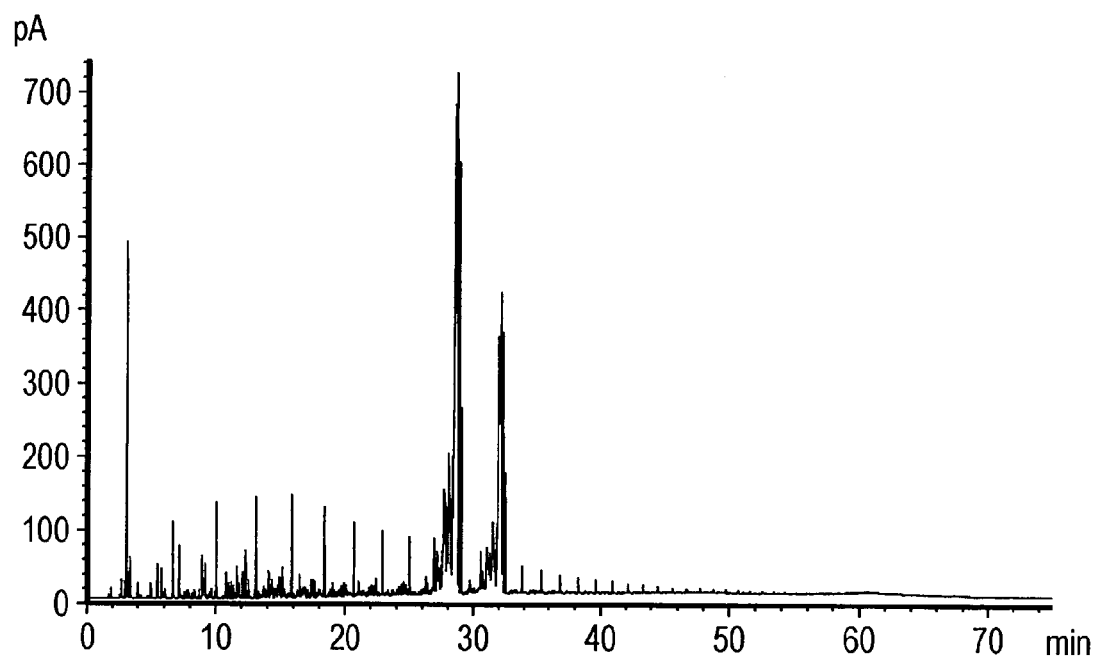
Figure 12C:
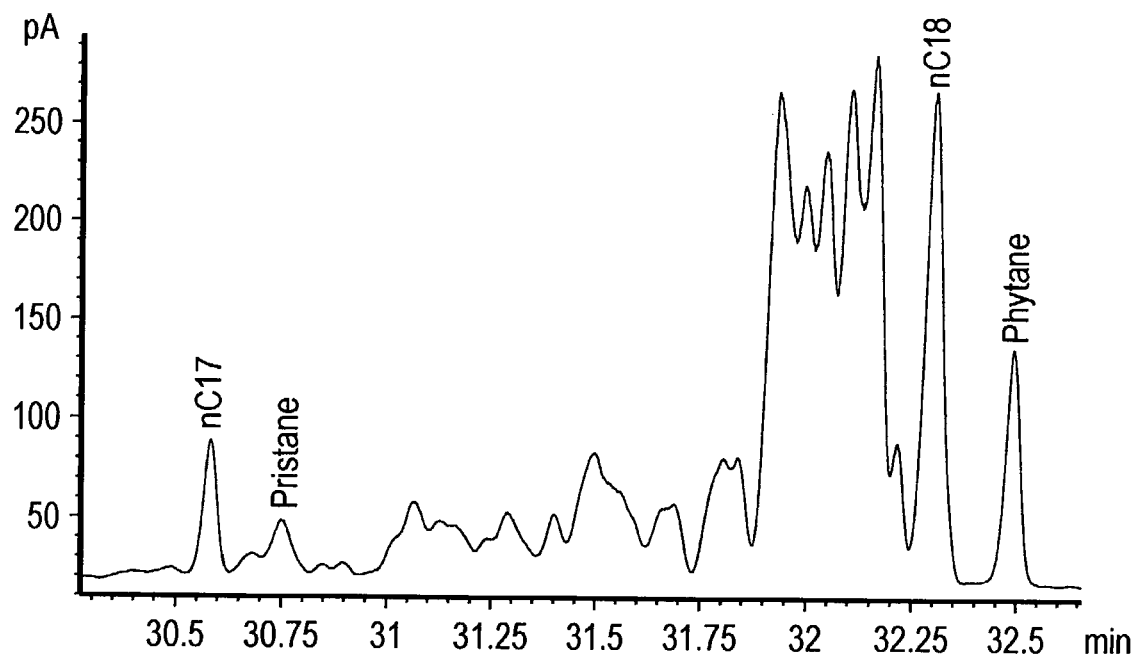
Figure 13C:
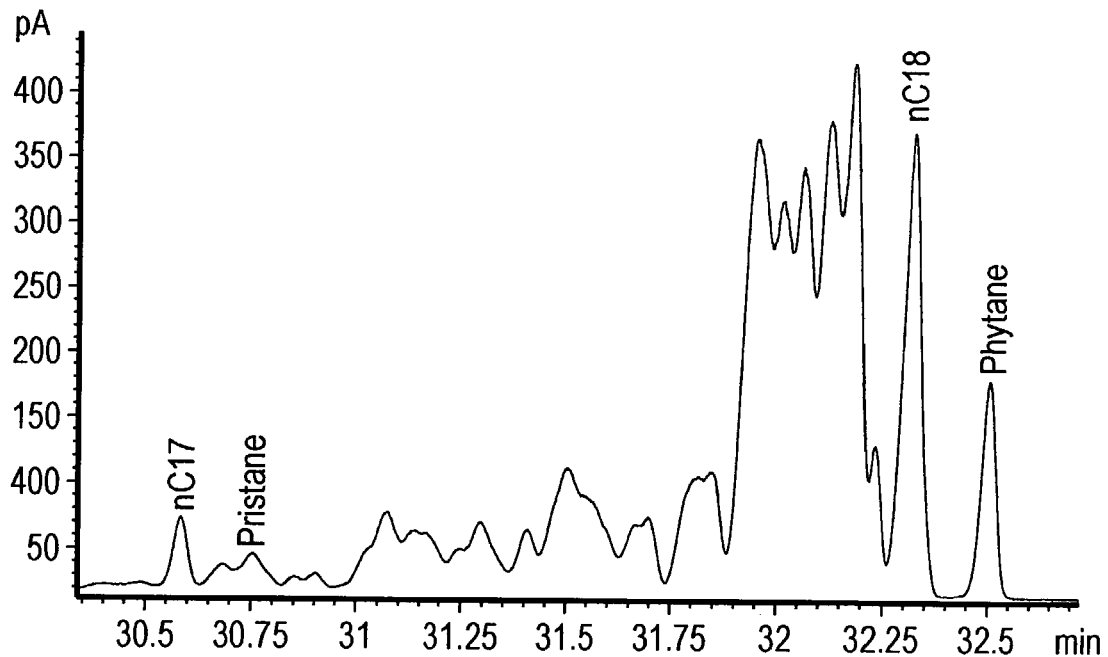
Figure 13B:
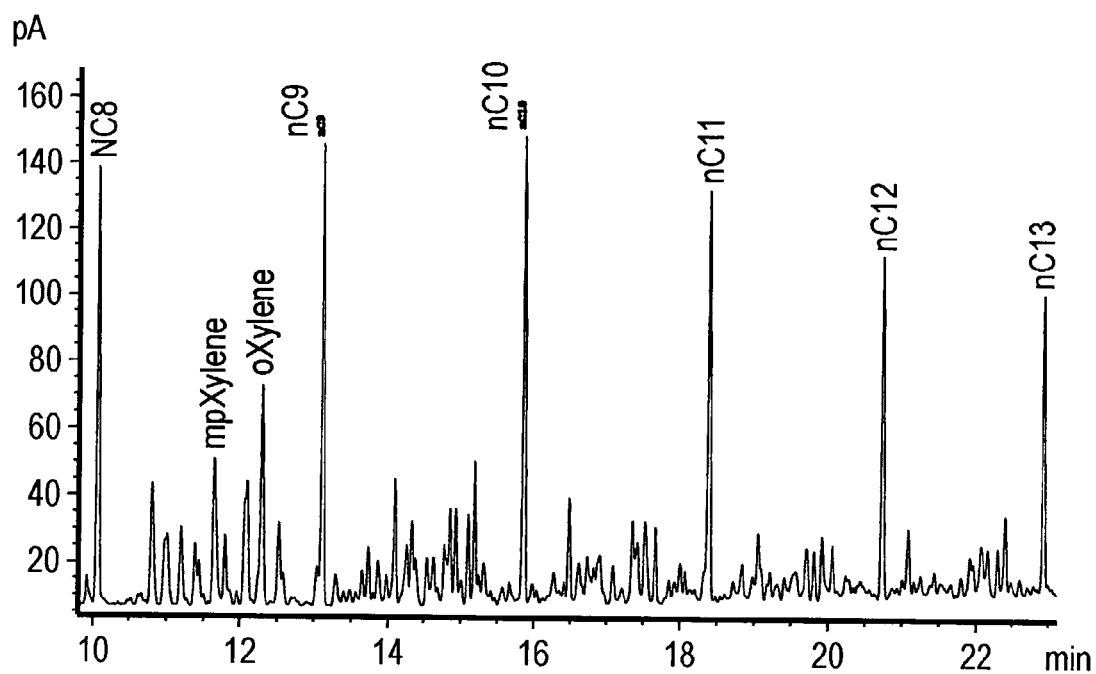
Figure 14B:
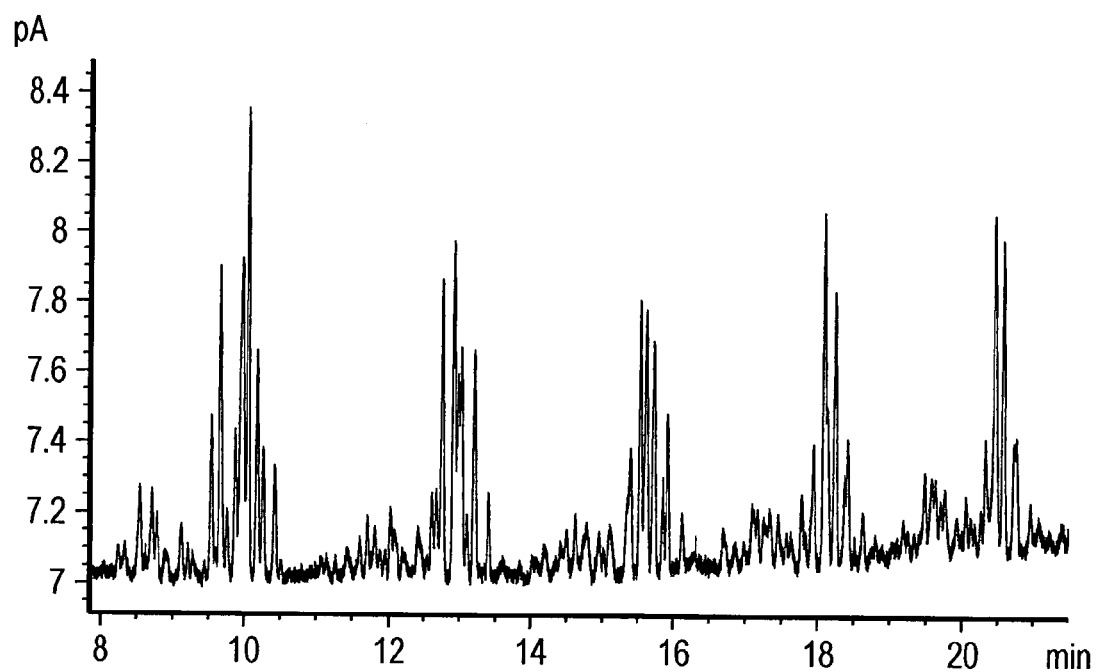
Figure 14C:
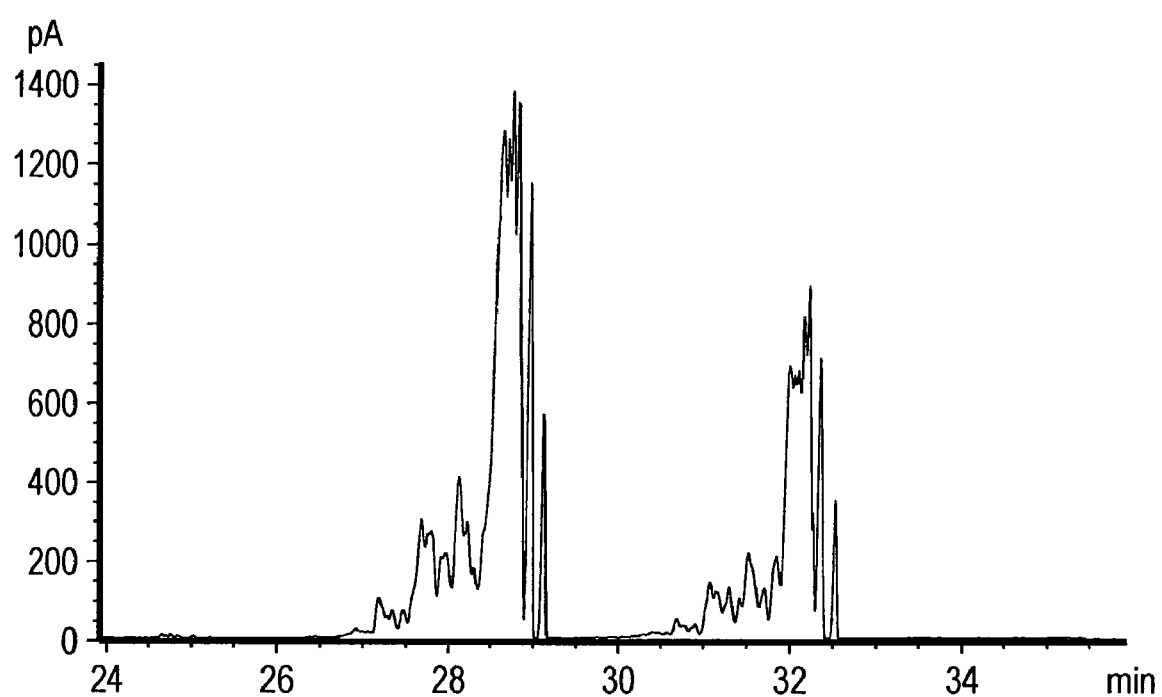
Figure 21:
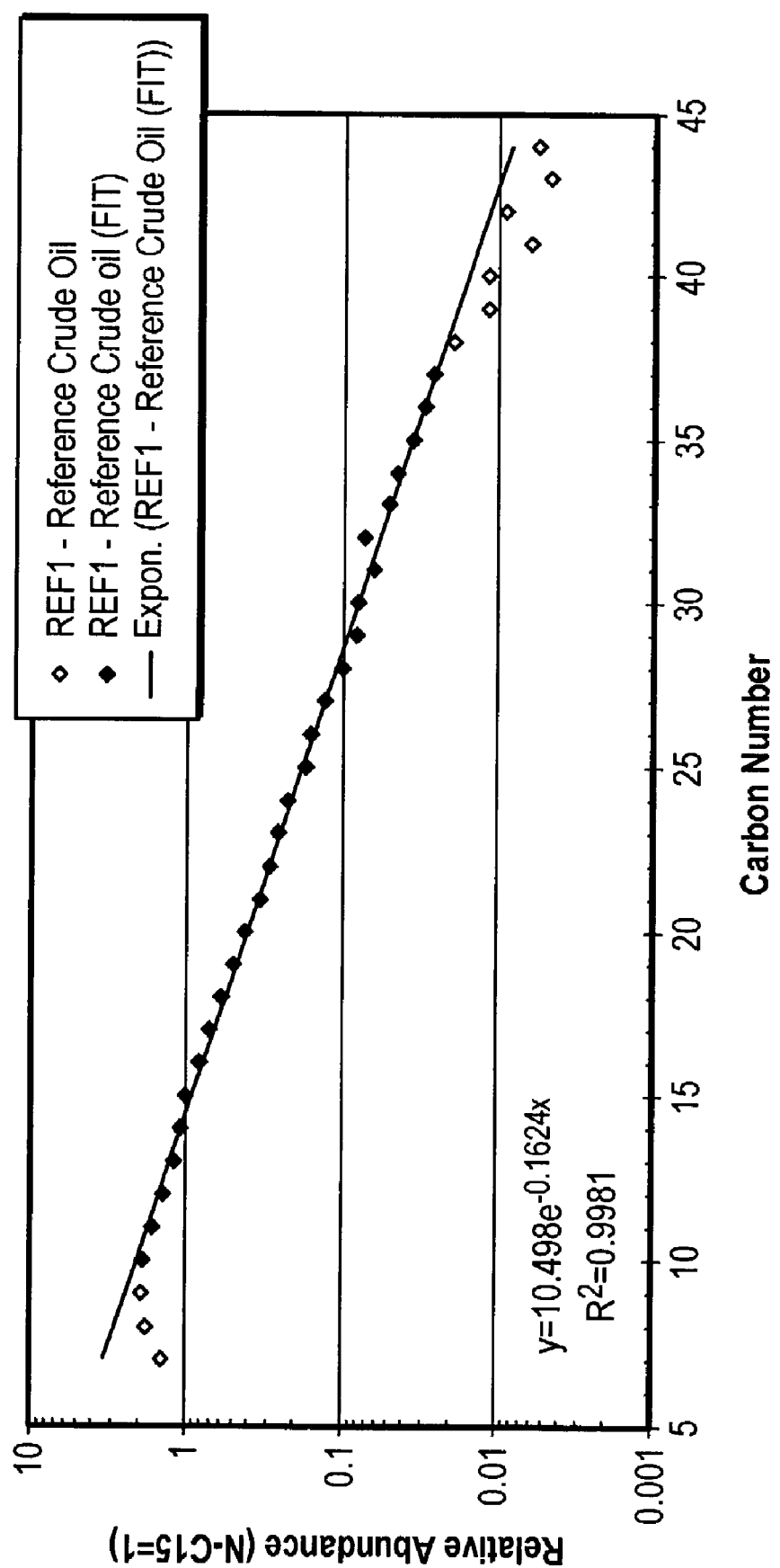
FIGS. 21-26 are graphs of the normal alkane distribution for the samples in Example 1.
Figure 22:
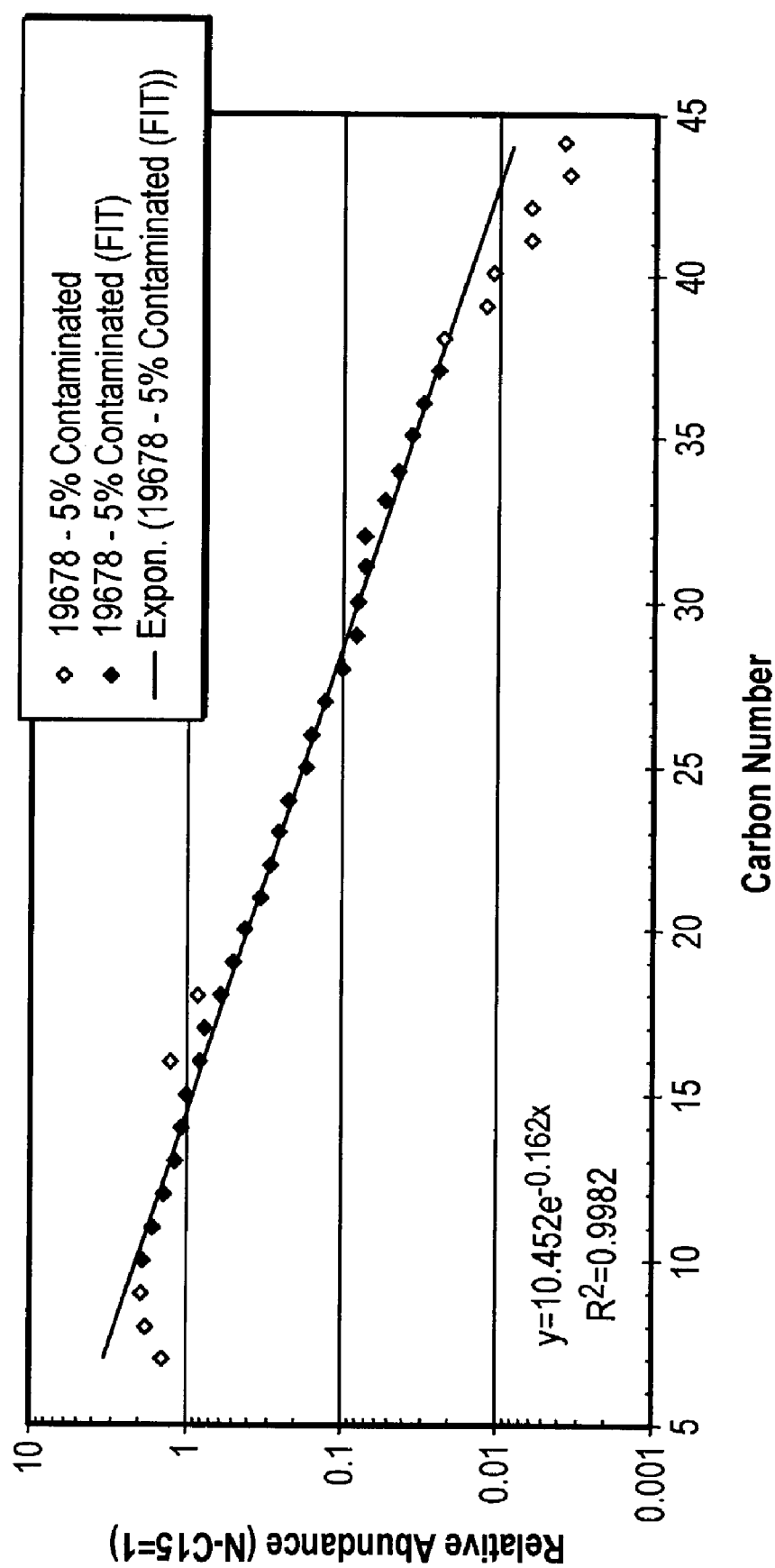
Figure 23:
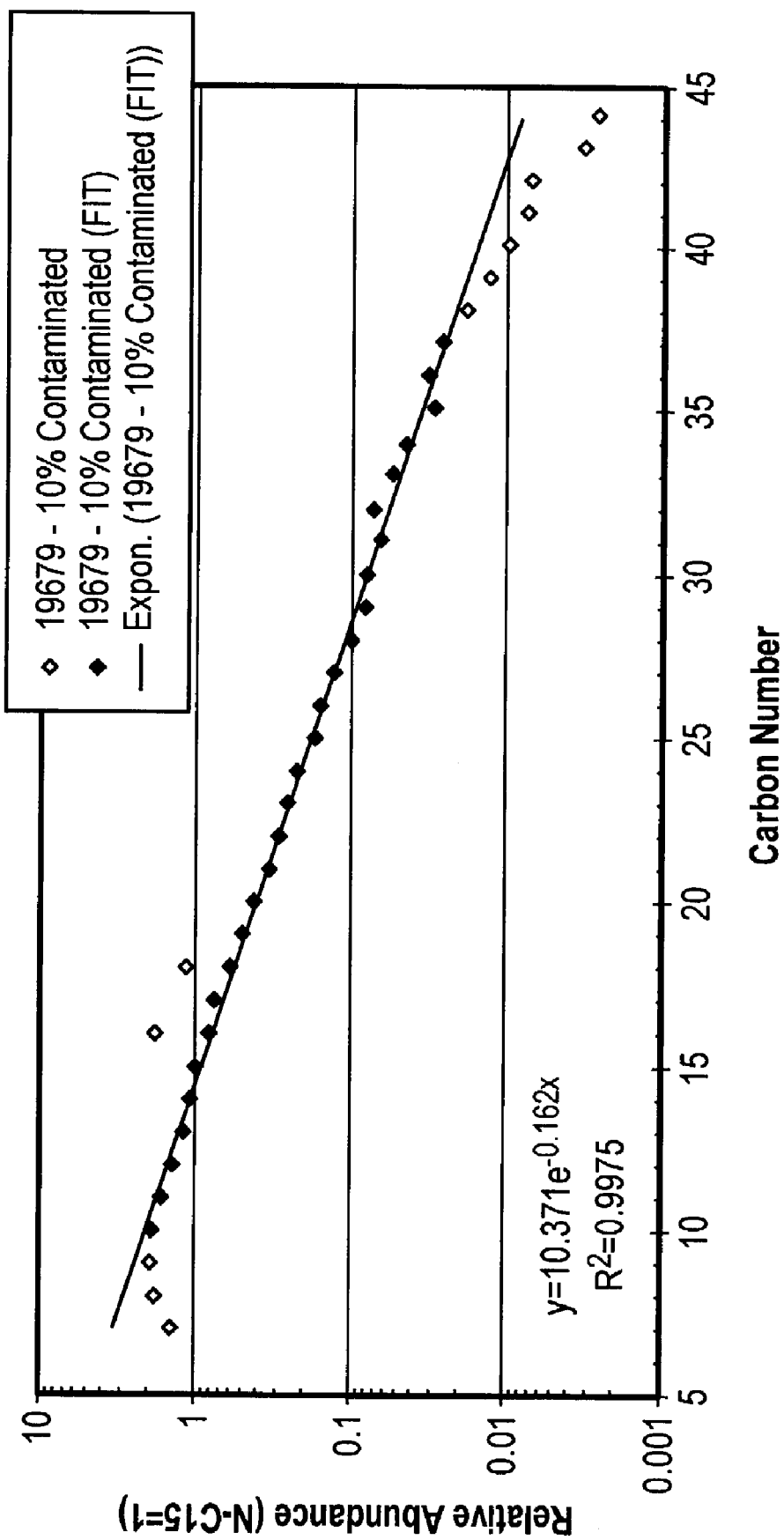
Figure 24:
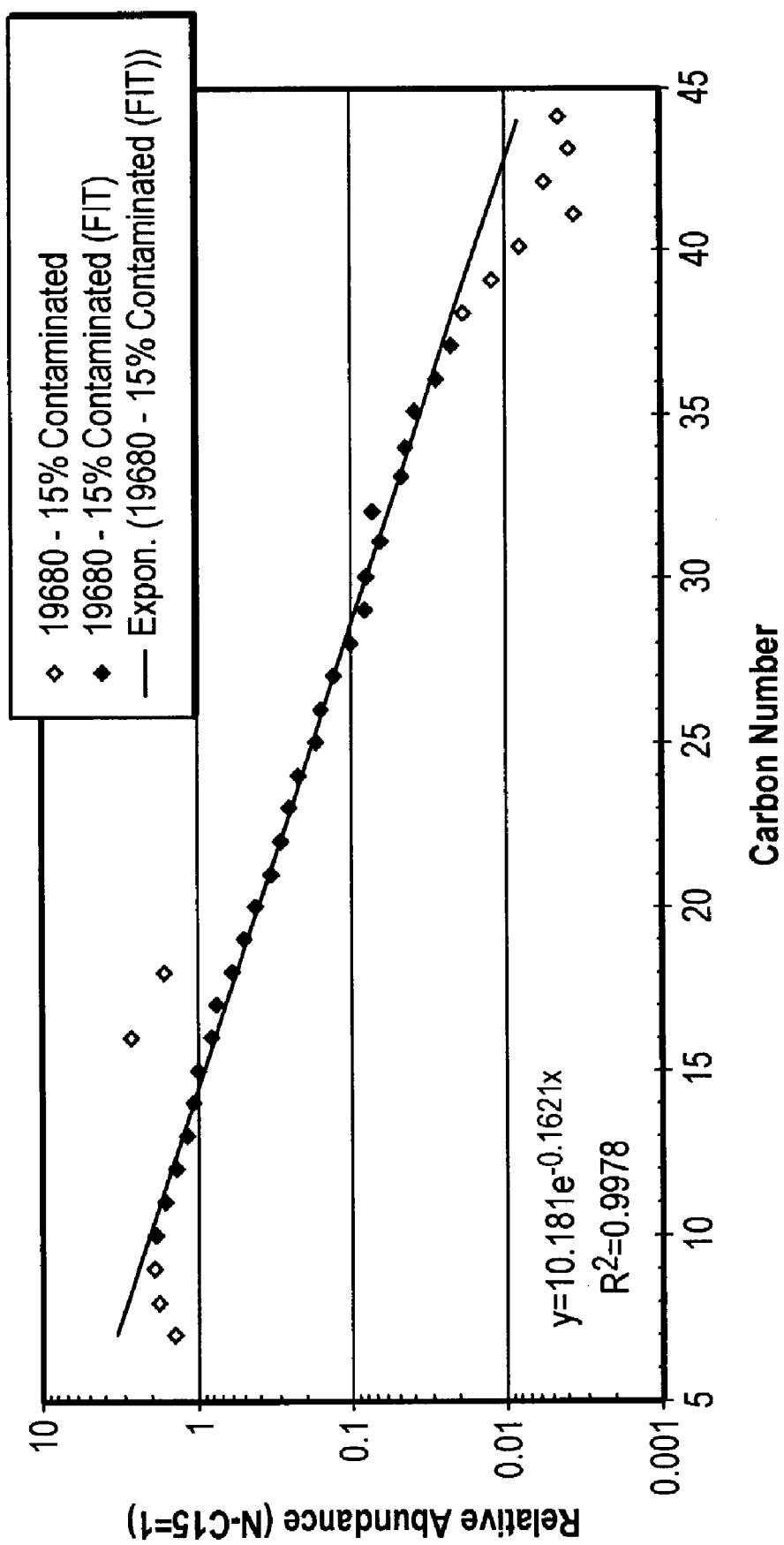
Figure 25:
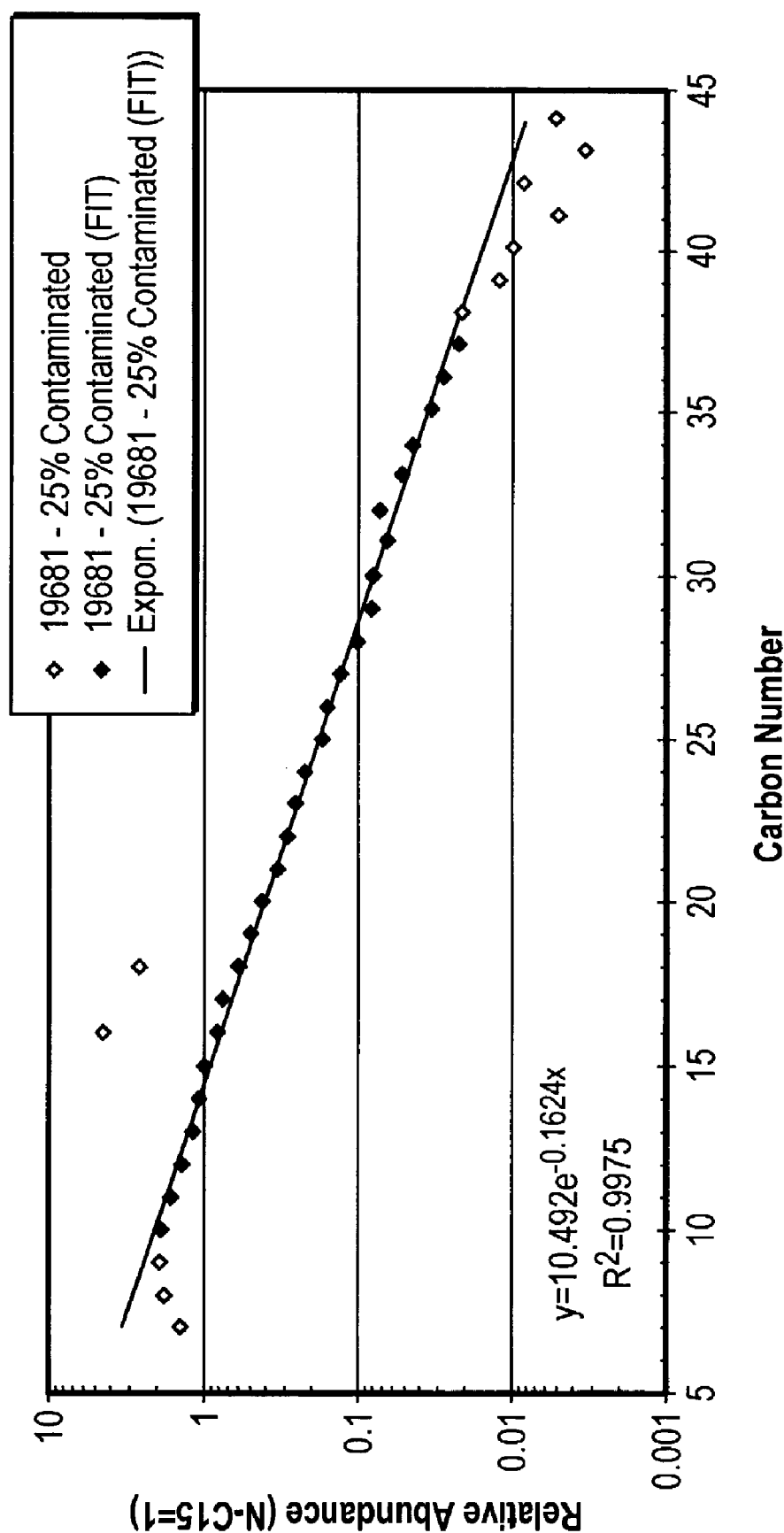
Figure 26:
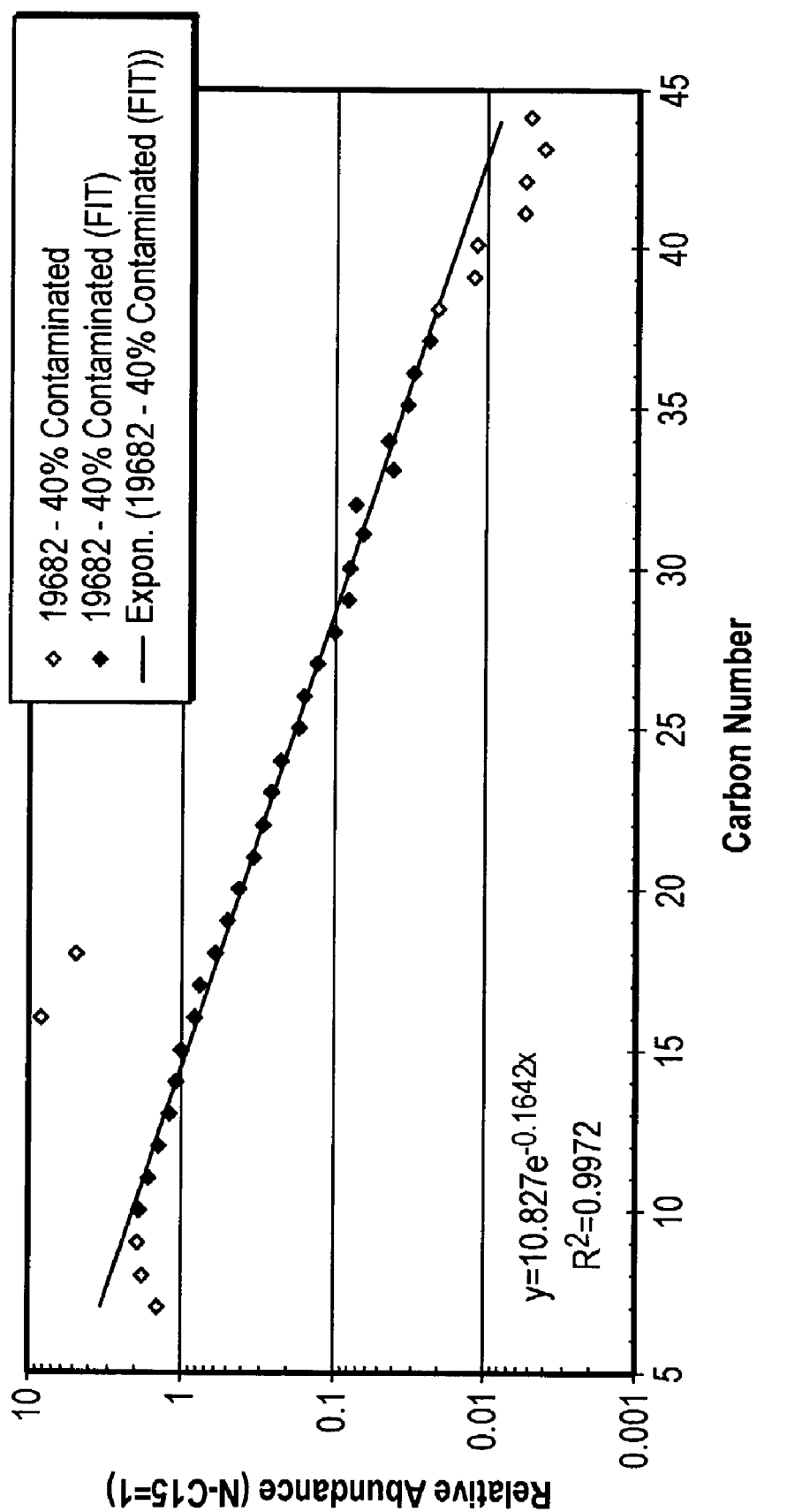
Figure 27:
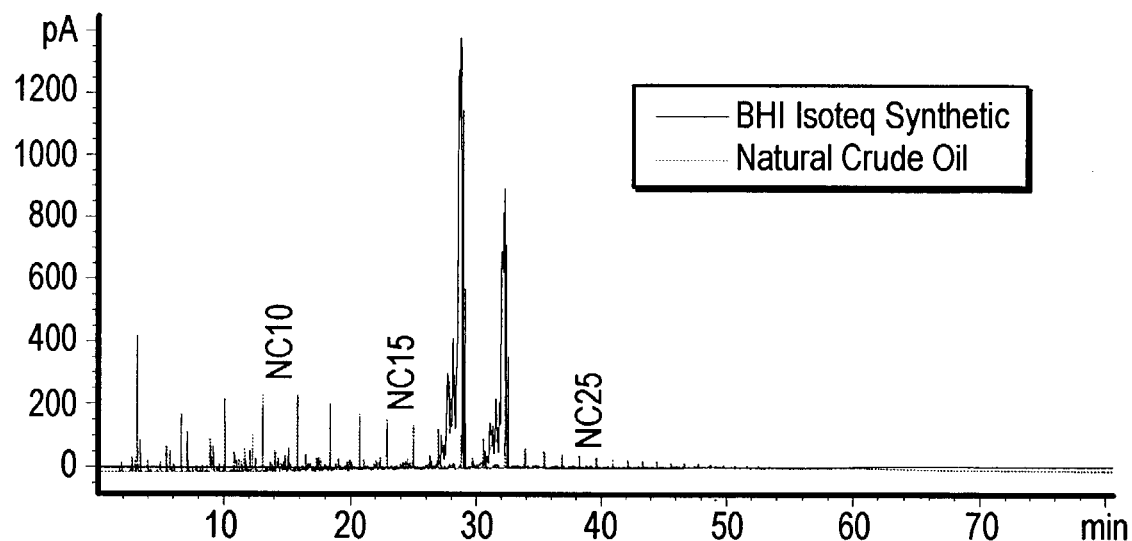
FIG. 27 is a Full Range Chromatogram overlay of the BHI Isoteq Synthetic and Gulf of Mexico Reference Crude Oil from FIGS. 1 and 2.
Figure 28:
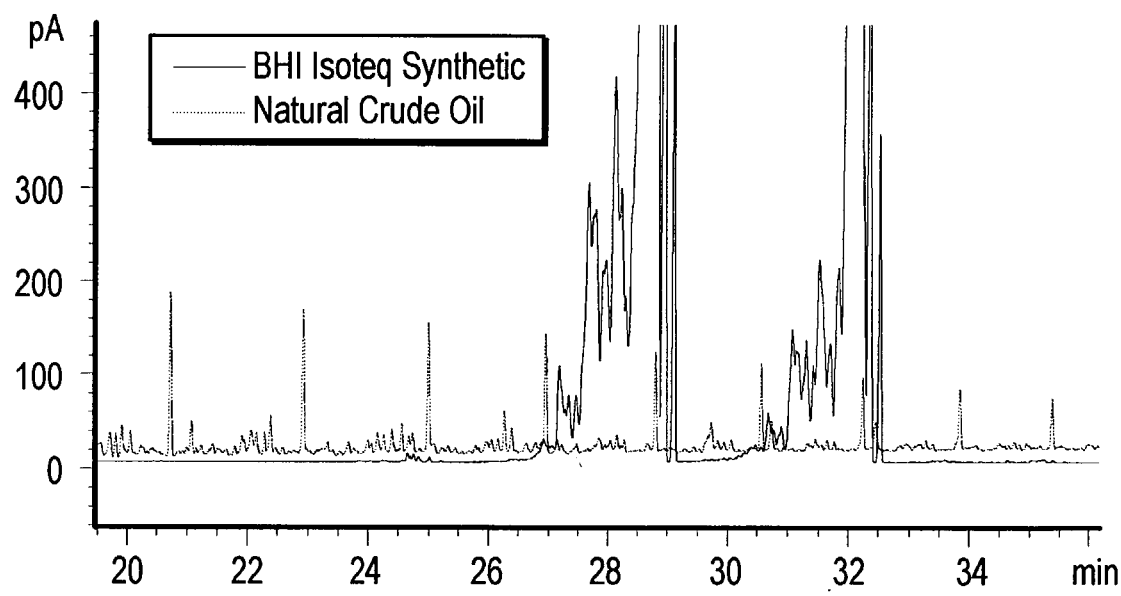
FIG. 28 is a Detail Chromatogram overlay of the BHI Isoteq Synthetic and Gulf of Mexico Reference Crude Oil from FIGS. 1 and 2.

FIG. 27 contains a full scale overlay of the chromatograms for the Isoteq derivative (FIG. 8a) and for the Gulf of Mexico reference crude (FIG. 14a). FIG. 28 contains a detail overlay of the two chromatograms of FIGS. 8a and 14a showing the lower of the C12 to C20 range only. The dominant peaks in the synthetic overlaid and obscured the C16 and C18 regions of the chromatogram. There was also some overlap by minor peaks at C14. At C17 the overlap was minor with only small peaks occurring with NC17 and pristane.

Referring to Table A, which also summarizes the geochemical parameters for the synthetic-oil mixtures, the natural oil parameters were affected with as little as 5% Isoteq contamination. The pristane/n-C17 ratio had the smallest change, because the Isoteq impacted the C18 compounds the most. SF values were calculated by removing those normal paraffins influenced by the synthetic base oil. As expected, the SF values did not change until the 40% contamination level was reached.

Figure 29:
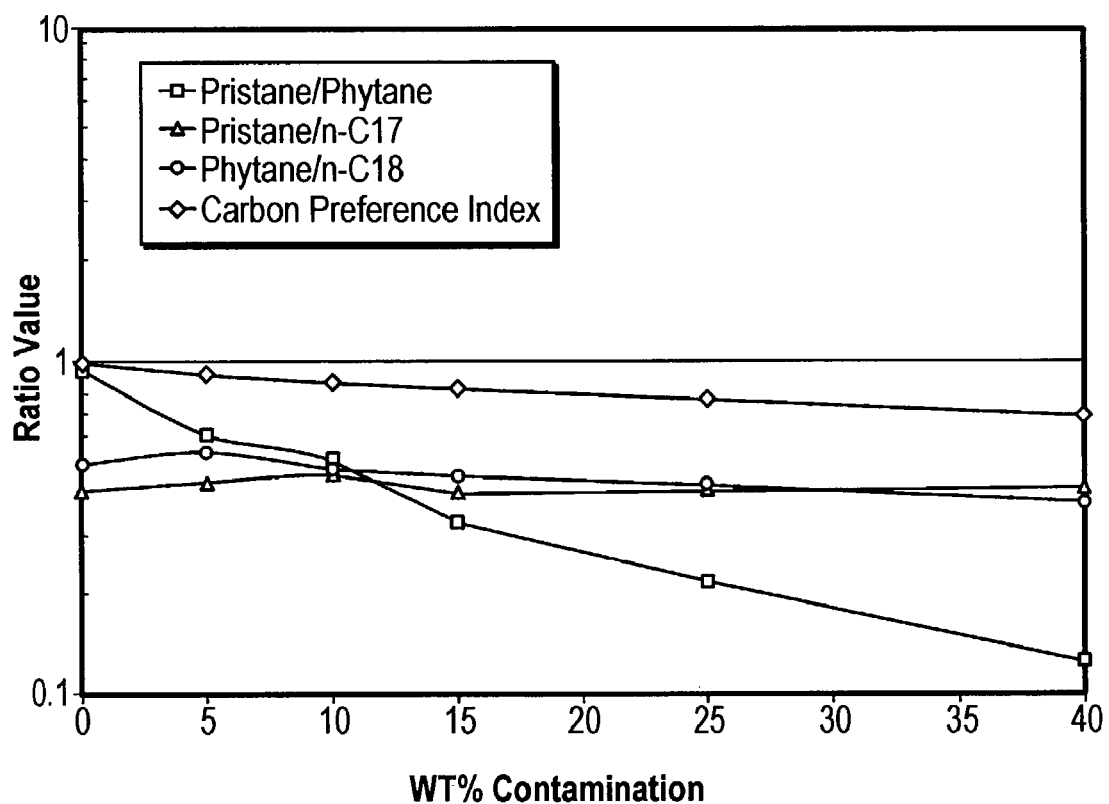
FIG. 29 is a plot of the four basic geochemical parameters found in Table A against the level of synthetic mixed in the fluid.

FIG. 29 is a plot of the four basic geochemical parameters found in Table A against the level of synthetic mixed in the fluid. The variations in ratio values are significant even at the 5% level of Isoteq in the Gulf of Mexico reference crude oil. By 40% synthetic base oil in the natural oils, the parameters had changed up to a factor of seven. Even a small amount of this synthetic would yield unacceptable ratio values compared to the unmixed petroleum.

Figure 4:
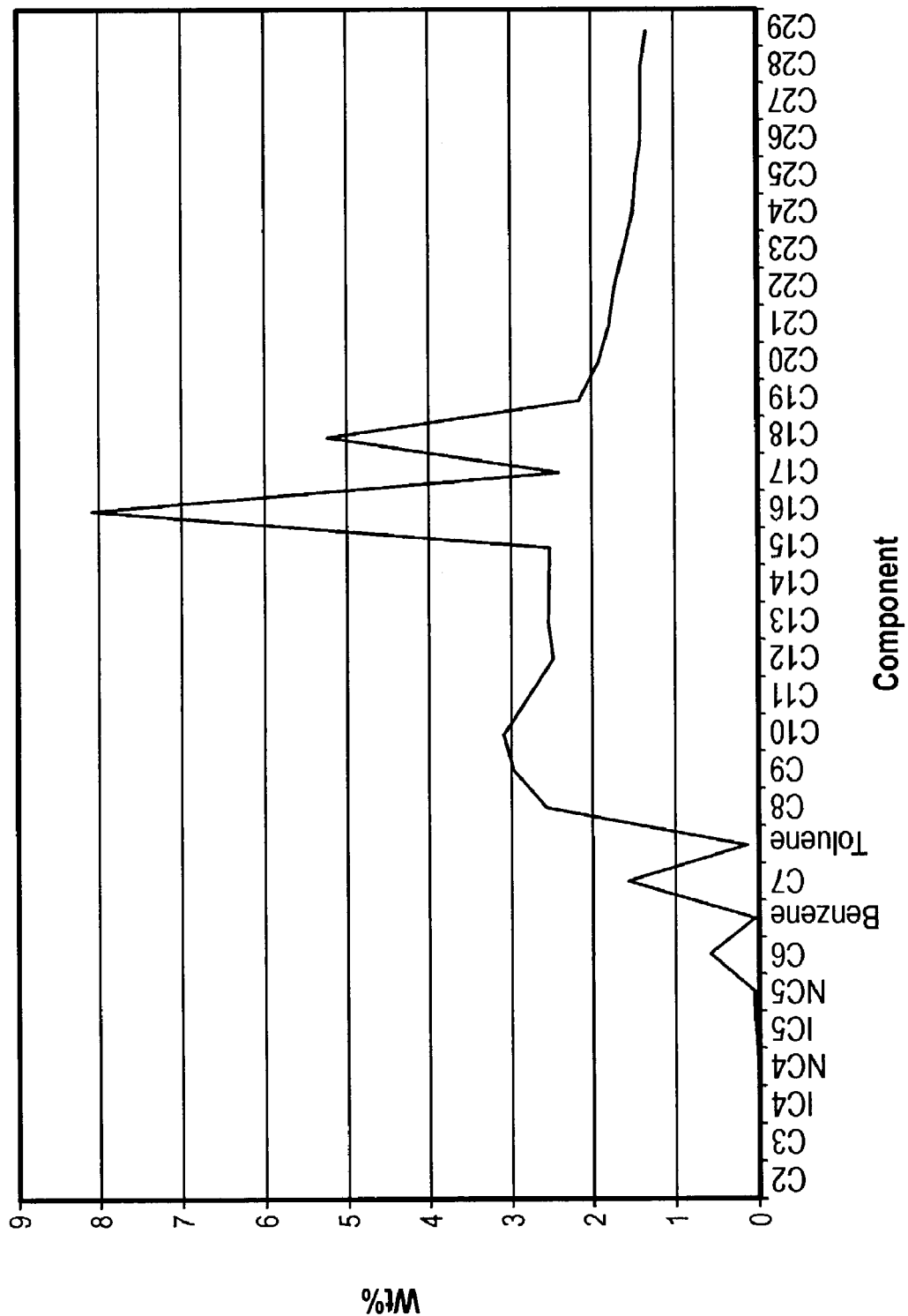
Figure 5:
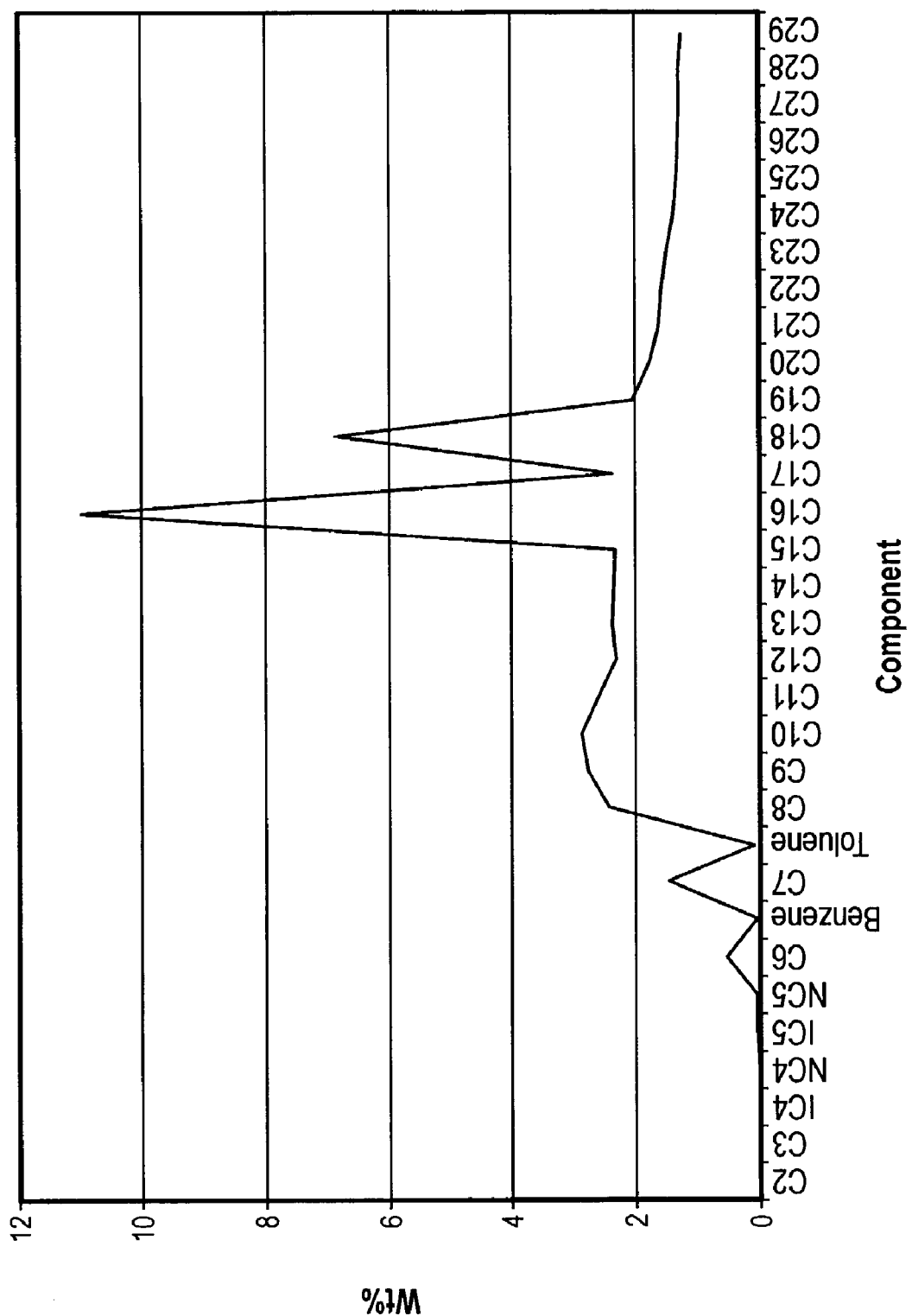
Figure 6:
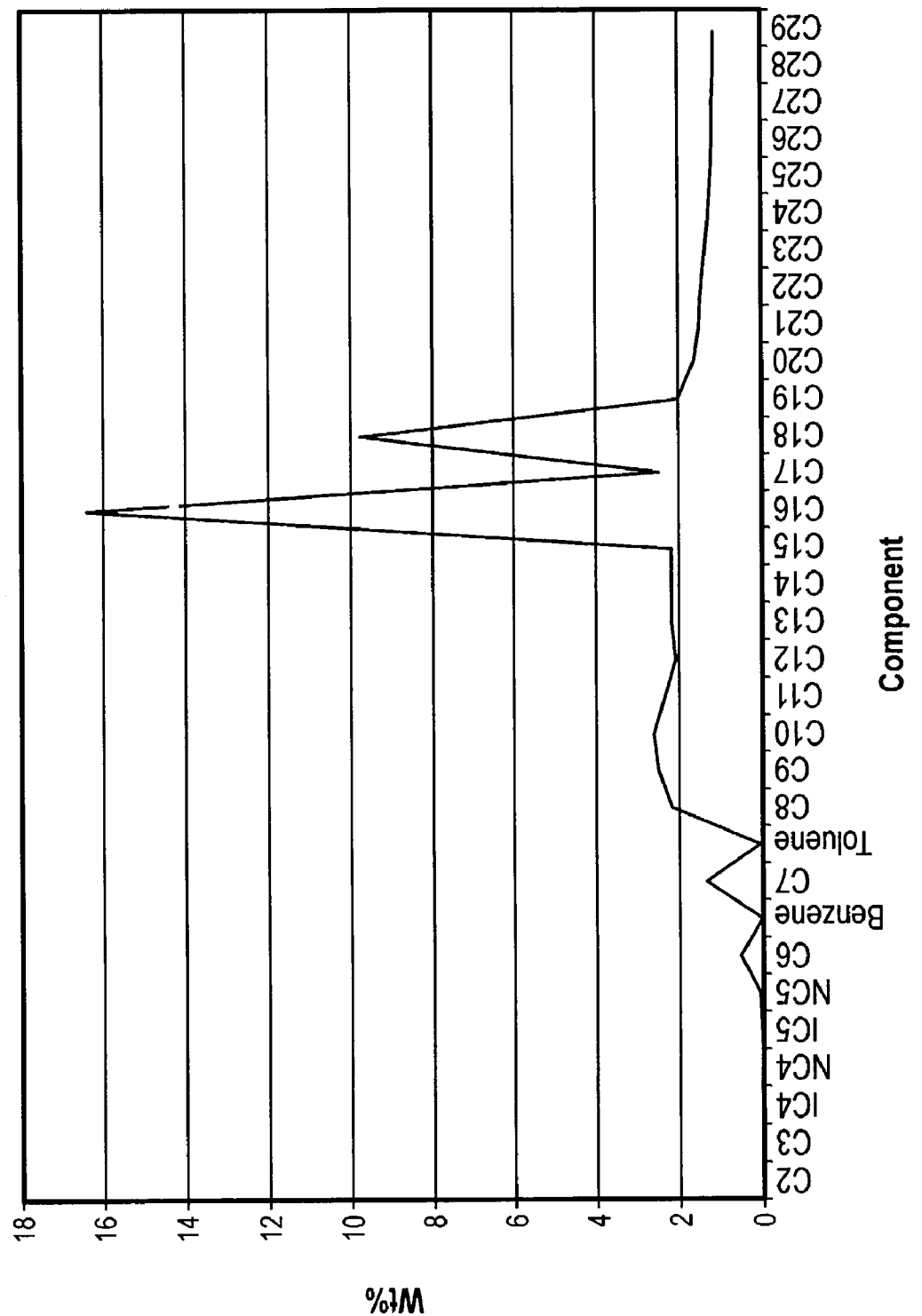
Figure 7:
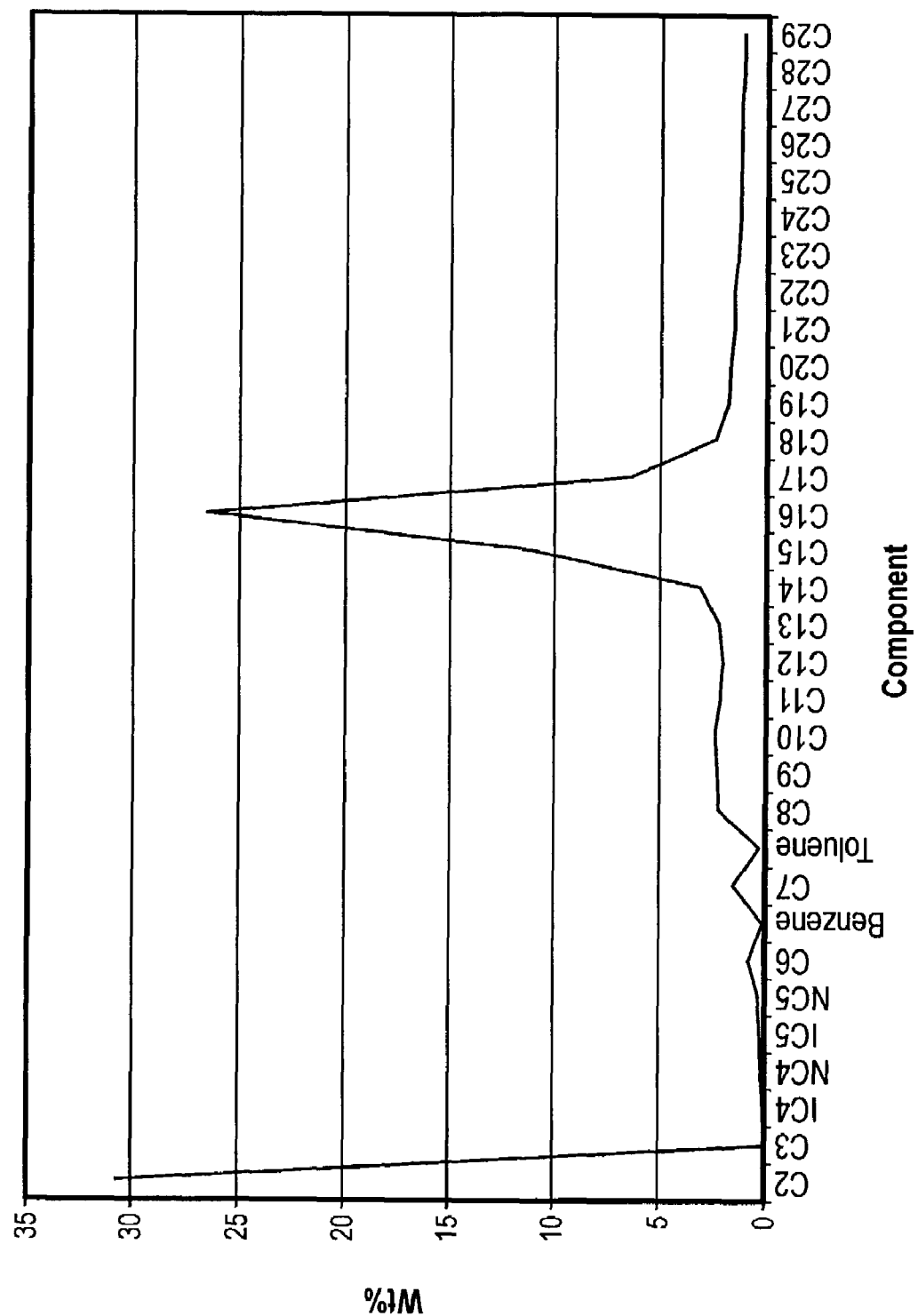
Figure 30:
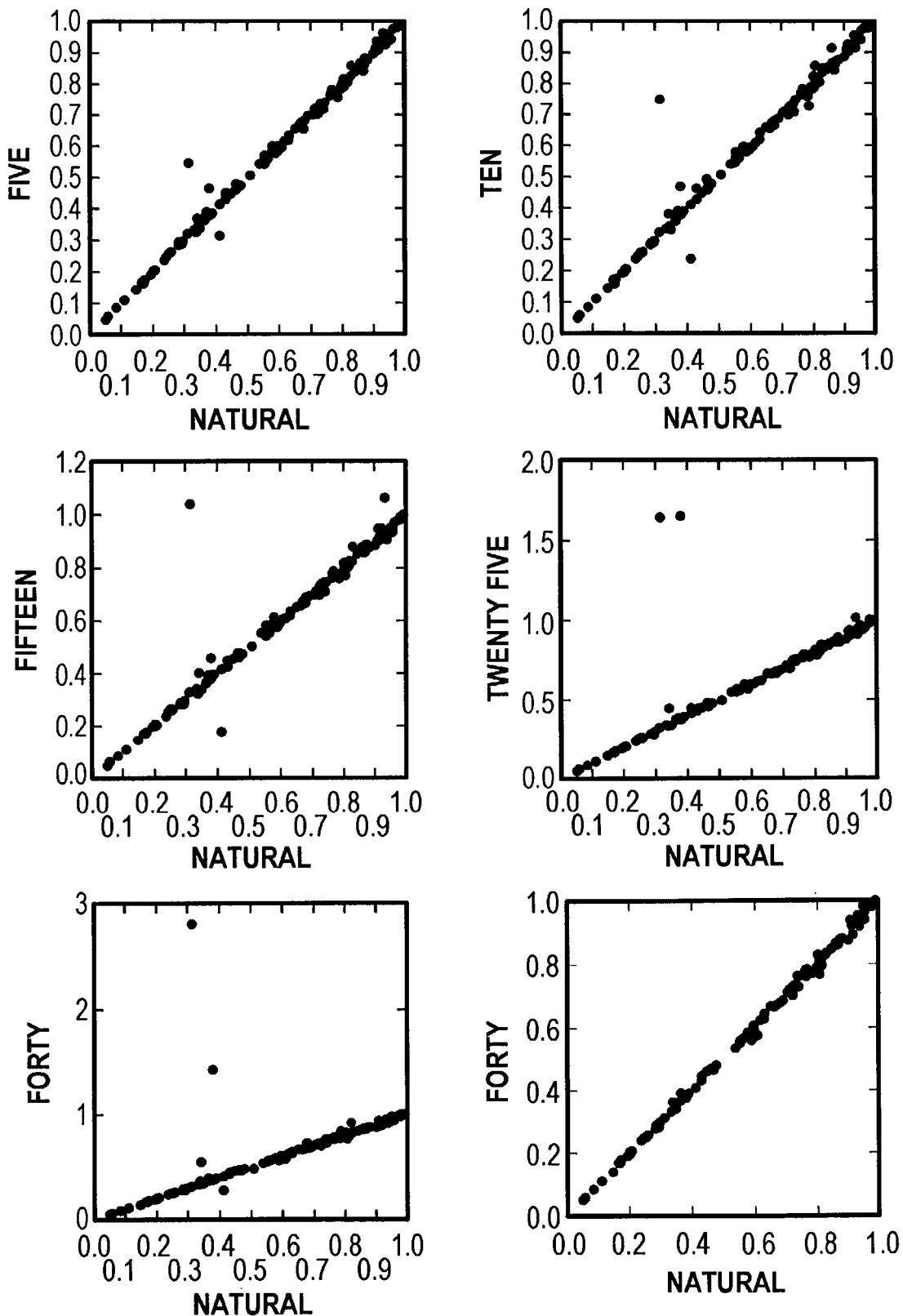
FIG. 30 contains a series of cross plots of fingerprinting peak ratios that were used in the statistical analysis.

FIG. 30 contains a series of cross plots of fingerprinting peak ratios that were used in the statistical analysis. The Y-axis plots the synthetic-natural oil mixtures from five to forty percent increasing from top to bottom. The X-axis is the natural oil in all cases. Each plot contains 124 peak ratios. If there were no impact from the synthetic contribution, the data would lie along a perfect line. However, some points deviate from the line, and this deviation increases with increasing proportion of synthetic in the natural oil. There are 12 ratios that deviate significantly from the expected line. Eliminating these peaks only reduces the number of valid ratios to 112, more than enough for any statistical analysis. The single cross plot in FIG. 4 shows the 40% data with deviant peaks removed, plotted against the natural oil. The graph follows the expected linear trend.

Cluster Analysis

Cluster analysis is a multivariate procedure for detecting natural groupings in data. Hierarchical clusters consist of clusters that completely contain other clusters that completely contain other clusters, and so on. Output from hierarchical cluster methods can be represented as a dendrogram, or tree diagram. The "root" of the tree is the linkage of all clusters into one set, and the ends of the branches are individual samples. To produce clusters, there must be a measure of dissimilarity between samples. Similar objects should appear in the same cluster and dissimilar objects in separate clusters.

Eventually all samples are grouped into one set. This is an important feature of hierarchical cluster analysis—by its very nature it will form groups, whether samples are necessarily naturally related or not.

What to identify as a "significant" group is always an issue in cluster analysis. There is no hard and fast statistical method, with identification of groups often tied to the data set at hand. Two measures of significance were used. One was the cluster distance of repeat analyses of the same material (A1 and A2). The cluster distance for these two samples was 0.0029; any samples grouping at similar distances were considered the same. Samples E and D formed a cluster at 0.0041, while B became part of the A1-A2 group at 0.044. These distances were less than twice the repeat cluster distance, indicating a close similarity. Such groups contain several (not just two) samples. Repeat analyses of standard oils was used as a guide. If unknown samples differed by more than 10 times the cluster distance of several standards, they clearly belonged in different groups. In the example above A1, A2 and B could be considered standards at a cluster distance of 0.0044, indicating that any samples grouping at 10*0.0044=0.044 were different.

We now have an upper limit for clusters (10*standards) and a lower limit (2*distance of repeats). In between, 3 to 5 times the standard distances was used as a guide, with the sample set providing important information (poorer quality samples implying larger distances). In large enough data sets the oils formed natural groups, which also served as important indicators of similarity or difference.

In summary:

Groups clustering at greater than 10 times cluster distance of standards—were definitely different Groups clustering at ~2 times repeat cluster distance—were definitely similar Guides for "good oil" data set—groups forming above 2-5 times repeat distance were different Sample set itself provides important clues to natural level of significance.

Figure 31A:
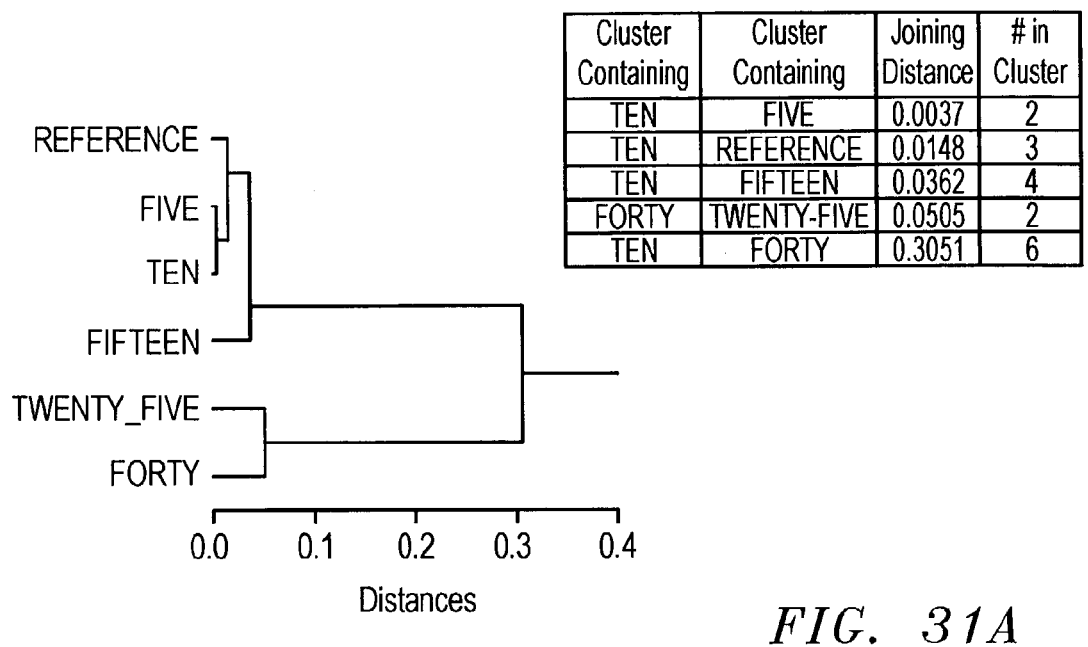
FIGS. 31a and 31b contain Tree Diagrams for Synthetic Oil Mixtures calculated using a standard suite of peak ratios.
Figure 31B:
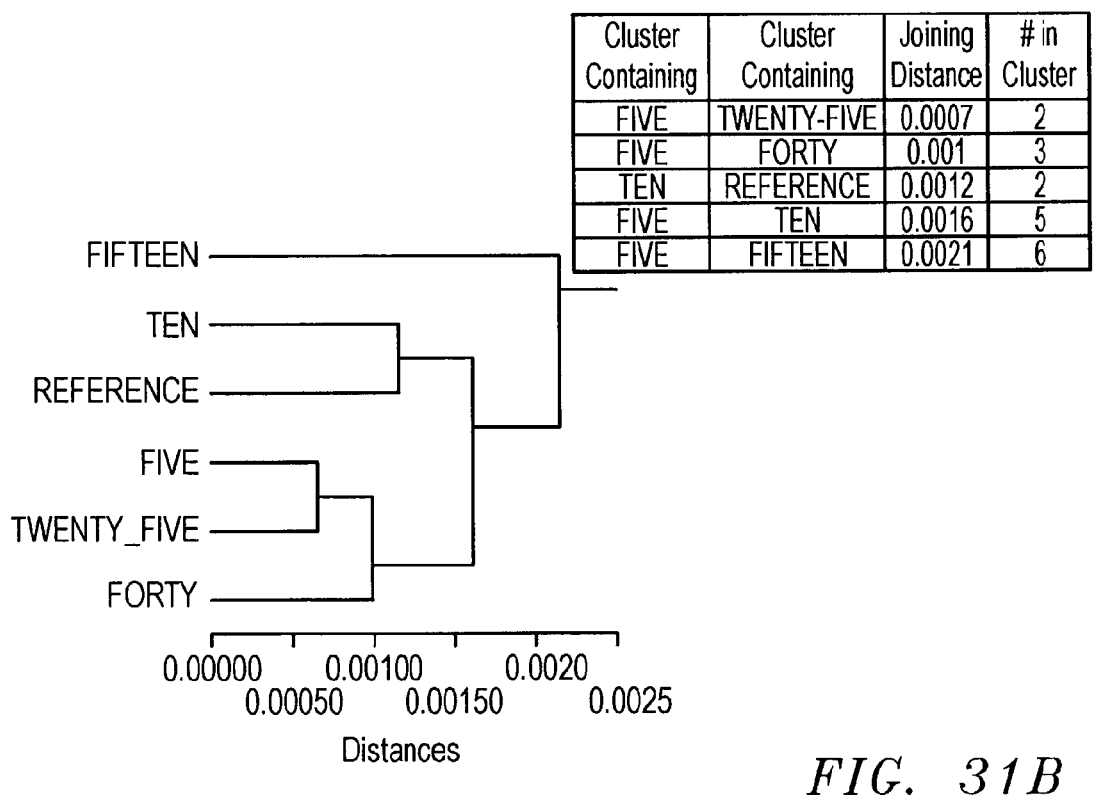

FIGS. 31a and 31b contain tree diagrams calculated using a standard suite of peak ratios. The upper tree diagram was calculated including those influenced by the synthetic drilling mud additive. The measure of cluster distance is given in the Table below.

| Cluster Containing | Cluster Containing | Joining Distance | # in Cluster |
|---|---|---|---|
| TEN | FIVE | 0.0037 | 2 |
| TEN | REFERENCE | 0.0148 | 3 |
| TEN | FIFTEEN | 0.0362 | 4 |
| FORTY | TWENTY-FIVE | 0.0505 | 2 |
| TEN | FORTY | 0.3051 | 6 |

The 25% and 40% mixtures clustered at a much larger distance than the other samples. These were significantly more unlike the natural reference oil than the lower contaminated samples. FIG. 31b was calculated excluding those peak ratios influenced by the synthetic drilling mud. In this calculation, all the samples formed a single cluster by a distance of 0.0021, over 100 times less than in the calculation where the contaminant peaks were included. The cluster distance of 0.002 is equivalent to that found for replicate analyses of the same oil. This demonstrates that the influence of the synthetic base oil on the fingerprinting results can be successfully removed.

Discussion and Conclusions

The synthetic Isoteq sample contained the largest set of compounds at C16 and C18. Smaller contributions occurred at C14 and C20, with much smaller constituents at C17 and C22. Peaks above C22 and below C14 are absent from the Isoteq fluid. The natural oil has a full range of hydrocarbons from C4 to beyond C40, as expected for unaltered natural oil.

The variations in geochemical biomarker ratios based on pristane and phytane varied from the uncontaminated oil values with as little as 5% mixture of Isoteq. By 40% synthetic base oil in the natural oil, the parameters had changed by as much as a factor of seven. When the fingerprints of the oil-synthetic mixtures were analyzed statistically, they showed differences from the natural oil, as expected. If the peaks influenced by the Isoteq fluid were excluded from the analysis, the mixtures behaved like duplicate measurements of the same sample.

The synthetic had characteristics that influenced geochemical parameters in a manner similar to previous C16-C18 blends.

Persons of ordinary skill in the art will appreciate that many modifications may be made to the embodiments described herein without departing from the spirit of the present invention. Accordingly, the embodiments described herein are illustrative only and are not intended to limit the scope of the present invention.

We claim:

1. A drilling system fluid adapted to provide accurate reservoir fluid characterization analysis comprising:
   a drilling system fluid having effective rheology and fluid loss control properties, the drilling system fluid comprising a continuous phase comprising olefins;
   wherein the olefins consist essentially of (a) a first quantity of isomerized olefins having from 14 to 17 carbon atoms, about 50 vol. % or more of the isomerized olefins having from 15 to 16 carbon atoms, at least some of the isomerized olefins have 15 carbon atoms, and (b) a second quantity of from about 10 vol. % to about 20 vol. % linear alpha olefins having 16 carbon atoms.

2. The drilling system fluid of claim 1 wherein 20 volume % or less of the olefins have greater than 16 carbon atoms.

3. The drilling system fluid of claim 1 wherein the vol. % of said isomerized olefin having 15 carbon atoms is substantially the same as the vol. % of said isomerized olefins having 16 carbon atoms.

4. The drilling system fluid of claim 1 wherein said isomerized olefins have the following general formula:

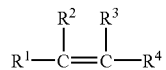

wherein, $R^1$ and $R^4$ independently are selected from the group consisting of straight chain alkyl, alkenyl, and polyalkenyl groups having from about 1 to about 14 carbon atoms, and branched alkyl, alkenyl, and polyalkenyl groups having from about 1 to about 14 carbon atoms, said branched alkyl alkenyl, and polyalkenyl groups further having from about 0 to about 2 substituents selected from the group consisting of alkyl and alkenyl groups having from about 1 to about 5 carbon atoms; and, $R^2$ and $R^3$ independently are selected from the group consisting of hydrogen, alkyl, and alkenyl groups having from about 1 to about 5 carbon atoms.

5. The drilling system fluid of claim 4 wherein said isomerized olefins consist essentially of a single unsaturated carbon-carbon bond, and have from about 0 to about 2 substituents selected from the group consisting of alkyl groups having from about 1 to about 2 carbon atoms.

6. The drilling system fluid of claim 5 wherein said single unsaturated carbon-carbon bond is located at other than the alpha-position.

7. A drilling system fluid adapted to provide accurate reservoir fluid characterization analysis comprising:
   a drilling system fluid having effective rheology and fluid loss control properties, the drilling system fluid comprising a continuous phase;
   wherein the continuous phase comprises a blend of olefins consisting essentially of (a) a first quantity of isomerized olefins wherein about 70 vol. % or more of said isomerized olefins have from 15 to 16 carbon atoms, at least some of said isomerized olefins have 15 carbon atoms, and (b) a second quantity of from about 10 volume % to about 20 volume % linear alpha olefins having 16 carbon atoms.

8. The drilling system fluid of claim 7 wherein said second quantity is about 15 volume % or less of said blend.

9. The drilling system fluid of claim 7 wherein the vol. % of said isomerized olefin having 15 carbon atoms is substantially the same as the vol. % of said isomerized olefins having 16 carbon atoms.

10. The drilling system fluid of claim 8 wherein the vol. % of said isomerized olefin having 15 carbon atoms is substantially the same as the vol. % of said isomerized olefins having 16 carbon atoms.

11. The drilling system fluid of claim 7 wherein said isomerized olefins have the following general formula:

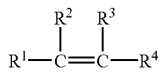

wherein,

R$^1$ and R$^4$ independently are selected from the group consisting of straight chain alkyl alkenyl, and polyalkenyl groups having from about 1 to about 14 carbon atoms, and branched alkyl, alkenyl, and polyalkenyl groups having from about 1 to about 14 carbon atoms, said branched alkyl, alkenyl, and polyalkenyl groups further having from about 0 to about 2 substituents selected from the group consisting of alkyl and alkenyl groups having from about 1 to about 5 carbon atoms; and, R$^2$ and R$^3$ independently are selected from the group consisting of hydrogen, alkyl, and alkenyl groups having from about 1 to about 5 carbon atoms.

12. The drilling system fluid of claim 7 wherein said isomerized olefins consist essentially of a single unsaturated carbon-carbon bond, and have from about 0 to about 2 substituents selected from the group consisting of alkyl groups having from about 1 to about 2 carbon atoms.

13. The drilling system fluid of claim 12 wherein said single unsaturated carbon-carbon bond is located at other than the alpha-position.

14. The drilling system fluid of claim 9 wherein said isomerized olefins have the following general formula:

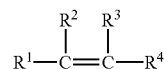

wherein,

R$^1$ and R$^4$ independently are selected from the group consisting of straight chain alkyl, alkenyl, and polyalkenyl groups having from about 1 to about 14 carbon atoms, and branched alkyl, alkenyl, and polyalkenyl groups having from about 1 to about 14 carbon atoms, said branched alkyl, alkenyl, and polyalkenyl groups further having from about 0 to about 2 substituents selected from the group consisting of alkyl and alkenyl groups having from about 1 to about 5 carbon atoms; and, R$^2$ and R$^3$ independently are selected from the group consisting of hydrogen, alkyl, and alkenyl groups having from about 1 to about 5 carbon atoms.

15. The drilling system fluid of claim 9 wherein said isomerized olefins consist essentially of a single unsaturated carbon-carbon bond, and have from about 0 to about 2 substituents selected from the group consisting of alkyl groups having from about 1 to about 2 carbon atoms.

16. The drilling system fluid of claim 15 wherein said single unsaturated carbon-carbon bond is located at other than the alpha-position.

17. The drilling system fluid of claim 7 wherein 20 volume % or less of the olefins have greater than 16 carbon atoms.

* * * * *

UNITED STATES PATENT AND TRADEMARK OFFICE
CERTIFICATE OF CORRECTION

PATENT NO. : 7,297,661 B2  
APPLICATION NO. : 10/293876  
DATED : November 20, 2007  
INVENTOR(S) : Timothy Martin Beyer and Steven Kyle Watson Page 1 of 1

It is certified that error appears in the above-identified patent and that said Letters Patent is hereby corrected as shown below:

In col. 8, line 36, insert a comma after the word "alkyl."

Signed and Sealed this

Eighteenth Day of March, 2008

JON W. DUDAS  
*Director of the United States Patent and Trademark Office*